United States Patent
Sparks et al.

(10) Patent No.: US 11,459,458 B2
(45) Date of Patent: Oct. 4, 2022

(54) HYDROLYSIS RESISTANT POLYAMIDES

(71) Applicant: Ascend Performance Materials Operations LLC, Houston, TX (US)

(72) Inventors: Bradley J. Sparks, Pace, FL (US); Ryan M. Hensarling, Pace, FL (US)

(73) Assignee: Ascend Performance Materials Operations LLC, Houston, TX (US)

( * ) Notice: Subject to any disclaimer, the term of this patent is extended or adjusted under 35 U.S.C. 154(b) by 276 days.

(21) Appl. No.: 16/788,948

(22) Filed: Feb. 12, 2020

(65) Prior Publication Data
US 2020/0255662 A1    Aug. 13, 2020

Related U.S. Application Data

(60) Provisional application No. 62/804,513, filed on Feb. 12, 2019.

(51) Int. Cl.
*C08L 77/06* (2006.01)
*C08K 5/098* (2006.01)
*C08K 7/14* (2006.01)

(52) U.S. Cl.
CPC .............. *C08L 77/06* (2013.01); *C08K 5/098* (2013.01); *C08K 7/14* (2013.01); *C08L 2205/025* (2013.01)

(58) Field of Classification Search
None
See application file for complete search history.

(56) References Cited

U.S. PATENT DOCUMENTS

| | | |
|---|---|---|
| 2,071,250 A | 2/1937 | Carothers |
| 2,071,251 A | 2/1937 | Carothers |
| 2,130,523 A | 9/1938 | Carothers |
| 2,130,948 A | 9/1938 | Carothers |
| 2,241,322 A | 5/1941 | Hanford |
| 2,312,966 A | 3/1943 | Hanford |
| 2,512,606 A | 6/1950 | Bolton et al. |
| 3,236,914 A | 2/1966 | David et al. |
| 3,373,223 A | 3/1968 | Armstrong |
| 3,393,210 A | 7/1968 | Speck |
| 3,472,916 A | 10/1969 | Anspon et al. |
| 3,546,319 A | 12/1970 | Prevorsek et al. |
| 3,984,497 A | 10/1976 | Owens et al. |
| 4,031,164 A | 6/1977 | Hedrick et al. |
| 4,320,213 A | 3/1982 | Woodbrey et al. |
| 4,346,200 A | 8/1982 | Woodbrey |
| 4,707,513 A | 11/1987 | Baer |
| 4,713,415 A | 12/1987 | Lavengood et al. |
| 4,760,129 A | 7/1988 | Haering et al. |
| 4,981,906 A | 1/1991 | Tomono et al. |
| 5,504,185 A | 4/1996 | Toki et al. |
| 5,543,495 A | 8/1996 | Anolick et al. |
| 5,698,658 A | 12/1997 | Dujari et al. |
| 6,011,134 A * | 1/2000 | Marks .................... C08G 69/28 528/310 |
| 6,136,947 A | 10/2000 | Wiltzer et al. |
| 6,169,162 B1 | 1/2001 | Bush et al. |
| 6,197,855 B1 | 3/2001 | Lysek et al. |
| 7,138,482 B2 | 11/2006 | Tanaka et al. |
| 7,381,788 B2 | 6/2008 | Tsujii et al. |
| 7,858,172 B2 | 12/2010 | Imaizumi et al. |
| 8,192,664 B2 | 6/2012 | Polk, Jr. et al. |
| 8,658,757 B2 | 2/2014 | Uehira et al. |
| 8,759,475 B2 | 6/2014 | Thierry et al. |
| 9,505,912 B2 | 11/2016 | Eibeck et al. |
| 2003/0111776 A1 | 6/2003 | Joachimi et al. |
| 2006/0111487 A1 | 5/2006 | Fish et al. |
| 2008/0011380 A1 | 1/2008 | Fish et al. |
| 2008/0269375 A1 | 10/2008 | Park et al. |
| 2011/0224346 A1 * | 9/2011 | Eibeck .................... C08K 13/04 524/413 |
| 2011/0293868 A1 | 12/2011 | Stoeppelmann et al. |

FOREIGN PATENT DOCUMENTS

WO    2015011001    1/2015

OTHER PUBLICATIONS

Kirk-Othmer, Encyclopedia of Chemical Technology, vol. 18, 3rd Edition, 1982, pp. 328-371.
International Application No. PCT/US2020/017912, International Search Report and Written Opinion dated May 25, 2020, 12 pages.

* cited by examiner

*Primary Examiner* — Robert T Butcher
(74) *Attorney, Agent, or Firm* — Cozen O'Connor

(57) ABSTRACT

A hydrolysis resistant polyamide composition comprising from 50 wt % to 80 wt % polyamide polymer having a theoretical amine end group content of at least 55 μeq/gram; and from 25 wt % to 60 wt % glass fibers. The weight ratio of polyamide polymer to glass fibers ranges from 0.5:1 to 4.0:1. The polyamide composition comprises less than 0.06 wt % copper; and/or from 1 ppb to 0.24 wt % non-copper metal halide compound. The polyamide composition, when hydrolysis aged for 500 hours at 130° C., demonstrates an impact resilience greater than 40 kJ/m$^2$, as measured at 23° C.

20 Claims, No Drawings

HYDROLYSIS RESISTANT POLYAMIDES

CROSS REFERENCE TO RELATED APPLICATION

The present application claims priority to and filing benefit of U.S. Provisional Patent Application No. 62/804,513, filed on Feb. 12, 2019, which is incorporated herein by reference in its entirety.

FIELD

The present disclosure relates generally to polyamide compositions having improved hydrolysis resistance, which are particularly useful for applications involving water contact and/or humidity.

BACKGROUND

Many varieties of natural and artificial polyamides have found use in various applications due to their high durability and strength. Some polyamide compositions can be formulated to have high melting points, high recrystallization temperatures, fast injection molding cycle times, high flow, toughness, elasticity, chemical resistance, inherent flame retardancy, and/or abrasion resistance. These desirable chemical and mechanical properties can make polyamide compositions suitable for use in constructing such diverse products as cable ties, sports equipment and sportswear, gun stocks, window thermal breaks, aerosol valves, food film packaging, automotive/vehicle parts, textiles, industrial fibers, carpeting, and electrical/electronic parts.

As one example, in the automotive industry there is an environmental need to reduce emissions and to increase the efficiency of fuel consumption. One approach towards achieving these goals is to reduce overall vehicle weight by substituting metal components with thermoplastic ones. And often times, polyamide compositions have been employed to provide such weight reduction in the engine compartment.

Also, polyamides have generally been found useful in engineering polymer applications, often times due to their good physical properties and chemical resistance. Many of these applications often require that the polyamide be in contact with water, and many applications require elevated temperatures. Examples include undersea oil applications and automobile engine applications, e.g., radiator tubing. Under such conditions, the amide bonds of many polyamides may be susceptible to hydrolysis in the presence of water and the rate of hydrolysis increases with temperature. Hydrolysis of the amide bonds can cause a reduction in molecular weight and concomitant loss in physical properties, e.g., tensile strength retention, that can result in failure of the pipe during use.

In some cases, glass-reinforced polyamides, e.g., PA-6,6, generally reinforced with lesser amounts of glass fibers, have been used successfully for injection molded automotive coolant circuit moldings. However, when producing tubes by injection molding, restrictions apply with regard to the possible geometries. Curved tubes generally cannot be produced using standard injection molding. While there are indeed specific processes for producing hollow articles with curved internal surfaces (for example fusible core process), these are associated with elevated additional costs.

As one example of conventional polyamide compositions, US Publication No. 2006/0111487A1 discloses polyamide compositions exhibiting superior hydrolysis resistance and pipes and other articles made therefrom. Also, US Publication No. 2008/0011380A1 discloses pipes that comprise polyamide compositions and that may optionally contain plasticizer, which have good hydrolysis resistance. Such pipes are suited for applications transporting hydrocarbons and may be in the form of flexible pipes.

Additionally, US Publication No. 2003/0111776A1 disclose a composition of reinforced polyamide (PA) for use in a cooling circuit of an engine. The composition may be processed by a gas injection technique (GIT) into shaped parts having smooth inner surfaces and a good hydrolytic stability against cooling medium such as glycol/water mixtures.

Also U.S. Pat. No. 9,505,912 discloses thermoplastic molding compositions, comprising from 20 to 85% by weight of at least one polyamide whose number of amino end groups is ≥50 mmol/kg; from 14.9 to 60% by weight of glass fibers; from 0.01 to 2% by weight of at least one heat stabilizer; from 0 to 1.5% by weight of at least one mold-release agent; and from 0 to 30% by weight of other additives, where the total of the percentages by weight of (A)-(E) is 100.

In addition to providing mechanical, e.g., tensile, strength, automotive applications also commonly require superior hydrolysis age performance. These performance characteristics, however, are often associated with conventional polyamide compositions which have not been designed for improved hydrolysis resistance.

Even in view of the existing art, the need therefore remains for improved polyamide compositions that effectively deliver superior hydrolysis resistance, mechanical properties, e.g., tensile strength retention and impact resilience under hydrolysis aging.

SUMMARY

In some embodiments, the disclosure relates to hydrolysis resistant polyamide composition comprising (from 5 wt % to 85 wt % of) (a crystalline or semi-crystalline) polyamide polymer, e.g., PA-6,6 polymer, comprising (at least 35 µeq/gram of) amine end groups, e.g., from 50 µeq/gram to 100 µeq/gram, (from 25 wt % to 60 wt % of) glass fibers; and less than 5 wt % of an antioxidant. The polyamide composition retains a tensile strength of at least 75 MPa, when heat aged for 3000 hours at a temperature of at least 180° C. and measured at 23° C. The weight ratio polyamide polymer to glass fibers may be at least 0.5:1, preferably ranging from 0.5:1 to 2:1. The relative viscosity of the polyamide polymer is at least 5, as measured by the formic acid method. The polyamide composition may further comprise (less than 2.2 wt % of) nucleation agent and/or (less than 5.0 wt % of) heat stabilizers and/or scavengers, e.g., less than 3.0 wt % copper-based heat stabilizers, and/or (less than 45 wt % of) lamellar mineral reinforcing materials or fillers, in particular, mica, and/or nigrosine, and/or a saturated fatty acid lubricant. In some cases, the polyamide composition comprises from 50 wt % to 80 wt % polyamide polymer; and from 20 wt % to 50 wt % glass fibers. In some cases, the polyamide composition comprises from 35 wt % to 65 wt % polyamide polymer; and from 35 wt % to 65 wt % glass fibers. The number average molecular weight of the polyamide polymer may be less than 100,000. The weight ratio of the polyamide polymer to the nigrosine may range from 1 to 85. The polyamide composition may comprise from 55 wt % to 72 wt % polyamide polymer; and from 20 wt % to 50 wt % glass fibers; wherein the polyamide polymer comprises from 70 µeq/gram to 80 µeq/gram amine end groups; and wherein the polyamide polymer has a relative viscosity ranging from 36 to 55. The polyamide composition may comprise from 45 wt % to 55 wt % polyamide polymer; and from 45 wt % to 55 wt % glass fibers; wherein the polyamide polymer comprises from 70 µeq/gram to 80 µeq/gram amine end groups; and wherein the polyamide polymer has a relative viscosity ranging from 36 to 55. The polyamide composition may comprise from 60 wt % to 70 wt % polyamide polymer; from 30 wt % to 40 wt % glass fibers; from 0.05 wt % to 2 wt % amine antioxidant; and from 0.5 wt % to 2 wt % phenol antioxidant; and wherein the polyamide polymer comprises from 74 µeq/gram to 80 µeq/gram amine end groups; and wherein the polyamide polymer has a relative viscosity ranging from 40 to 50. The polyamide composition comprising from 45 wt % to 51 wt % polyamide polymer; from 46 wt % to 53 wt % glass fibers; from 0.05 wt % to 2 wt % amine antioxidant; and from 0.5 wt % to 2 wt % phenol antioxidant; and wherein the polyamide polymer comprises from 74 µeq/gram to 80 µeq/gram amine end groups; and wherein the polyamide polymer has a relative viscosity ranging from 40 to 50. The disclosure relates to injection molded articles comprising the polyamide composition.

In some embodiment, the disclosure relates to a hydrolysis resistant polyamide composition comprising (from 50 wt % to 80 wt % or from 61 wt % to 73 wt %) polyamide polymer, e.g., PA-6,6, having a theoretical amine end group content of at least 55 µeq/gram, e.g., ranging from 62 µeq/gram to 82 µeq/gram, and (from 25 wt % to 60 wt % or from 25 wt % to 35 wt %) glass fibers. The weight ratio of polyamide polymer to glass fibers may range from 0.5:1 to 4.0:1, e.g., from 0.7:1 to 3.0:1. The polyamide composition may comprise less than 0.06 wt % copper, e.g., less than 0.01 wt % copper or the composition does not comprise copper or copper-based compounds; and/or from 1 ppb to 0.24 wt % non-copper metal halide compound, e.g., from 1 ppb to 0.23 wt %. The polyamide composition may comprise a first polyamide having a theoretical amine end group content ranging from 75 µeq/gram to 90 µeq/gram and a second polyamide having a theoretical amine end group content ranging from 40 µeq/gram to 50 µeq/gram; wherein the theoretical amine end group content of the polyamide polymer is at least 55 µeq/gram. The composition may further comprise zinc stearate, or stearic acid, or combinations thereof and/or may not comprise calcium-based compounds. The relative viscosity of the polyamide polymer may be at least 5, as measured by the formic acid method. The polyamide composition may comprise from 61 wt % to 73 wt % polyamide polymer and from 25 wt % to 35 wt % glass fibers; the polyamide polymer may have a theoretical amine end group content ranging from 62 µeq/gram to 85 µeq/gram; and a relative viscosity ranging from 36 to 55; and a weight ratio of polyamide polymer to glass fibers ranging from 1.5:1 to 2.8:1. The polyamide composition may comprise from 61 wt % to 73 wt % polyamide polymer wherein the polyamide polymer comprises from 27 wt % to 72 wt % of a first polyamide having a theoretical amine end group content ranging from 75 µeq/gram to 90 µeq/gram; and from 0 wt % to 50 wt % of a second polyamide having a theoretical amine end group content ranging from 20 µeq/gram to 49 µeq/gram. The composition may further comprise from 25 wt % to 35 wt % glass fibers; from 1 ppb to 0.24 wt % iodide compound; and less than 0.01 wt % copper. The polyamide polymer may have a theoretical amine end group content ranging from 60 µeq/gram to 85 µeq/gram; and a relative viscosity ranging from 36 to 55. The polyamide composition, when hydrolysis aged for 500 hours at 130° C., may demonstrate an impact resilience greater than 40 kJ/m$^2$, as measured at 23° C.; when hydrolysis aged for 1000 hours at 130° C., the polyamide composition may demonstrate an impact resilience greater than 19 kJ/m$^2$, as measured at 23° C.; when hydrolysis aged for 500 hours at 130° C., the polyamide composition may demonstrate an impact resilience retention greater than 53%, as measured at 23° C.; when hydrolysis aged for 1000 hours at 130° C., the polyamide composition may demonstrate an impact resilience retention greater than 24%, as measured at 23° C.; when hydrolysis aged for 500 hours at 130° C., the composition may demonstrate a tensile elongation greater than 2.03%, as measured at 23° C.; when hydrolysis aged for 500 hours at 130° C., the composition may demonstrate a tensile elongation retention greater than 63%, as measured at 23° C.; and/or when hydrolysis aged for 1000 hours at 130° C., the composition may demonstrate a tensile elongation greater than 0.66%, as measured at 23° C.

DETAILED DESCRIPTION

As noted above, many applications for which polyamides are used often require contact with water and/or elevated temperatures, which make the amide bonds of the polyamides susceptible to hydrolysis and the associated performance problems. Conventional polyamide compositions have employed heat stabilizer packages, and, in some cases, polyamides having higher amounts of amine end groups. These polyamide compositions often employ specific combinations of metal-based stabilizers, e.g., metal halides such as potassium iodide, potassium bromide, and/or copper iodide, in significant amounts (in some cases higher copper or copper compound content). It has proven difficult, however, for these conventional polyamide resins and compositions to meet hydrolysis resistance and strength demands.

Typical polyamide preparations intended for such applications also include a reinforcing filler such as glass fiber, often in smaller amounts such as at or below 30 wt %, to supply additional strength. While the addition of these fibers may improve performance, such conventional reinforced polyamides are also characterized, however, by less than optimal hydrolysis resistance properties.

The present disclosure generally relates to polyamide compositions that, when employed for example in applications involving water contact and/or humidity, provide advantageous improvements in hydrolysis resistance, which may be evidenced by, inter alia, tensile elongation and impact resilience.

The disclosed polyamide compositions and structures take a different approach to address heat stability of polyamides compositions—utilization of particular AEG levels in combination with (smaller amounts of) metal-based stabilizers. The effective use of these AEG levels contributes to improved mechanical properties and impact resilience. Without being bound by theory, it is believed that the interaction of the particular glass fibers with the amine end groups of the polyamide polymer, e.g., improved interaction between the fibers and the polymer matrix, may contribute to unexpected improvements in hydrolysis resistance. In addition, it is postulated that hydrolysis degradation is an acid-catalyzed reaction, and the presence of higher amounts of amine end groups (and/or lesser amounts of acid end groups) in the polyamide polymer has been found to surprisingly retard degradation, e.g., to improve hydrolysis resistance. It is believed that the synergistic combination of the aforementioned amine end group amounts and particular combination of other components provides for the unexpected hydrolysis resistance performance disclosed herein.

Further, because these AEG levels advantageously provide for improvements in performance, the need for stabilizer packages (to achieve the desired results) can be advantageously reduced or eliminated, which leads to process efficiencies, especially in view of the fact that many stabilizer packages contain expensive metal components. Also, the reduction or elimination of metal containing compounds, e.g., copper or potassium, is advantageous in end use applications. For example, in applications where fluid contact is prevalent, e.g., radiators, the lower metal content lessens the amount of metal that may be leached out into the fluid.

In one aspect, a hydrolysis resistant polyamide composition is disclosed. The composition includes a polyamide polymer, glass fibers, and an optional antioxidant. As described in greater detail below, the composition preferably includes from 5 wt % to 85 wt % of the polyamide polymers, from 25 wt % to 60 wt % glass fiber, and/or less than 5 wt % of antioxidant. By employing these components in the composition (at the concentrations and ratios disclosed herein), a polyamide composition that demonstrates improved hydrolysis resistance and strength characteristics is provided, for example, a polyamide that retains a tensile strength of at least 75 MPa, when heat aged for 3000 hours at a temperature of at least 180° C. and measured at 23° C.

In some cases, the disclosure relates to (low copper content) polyamide compositions comprising (from 50 wt % to 80 wt %) of polyamide polymer having a theoretical amine end group content of at least 55 µeq/gram (high AEG polyamide) and (from 25 wt % to 60 wt %) glass fibers. In some cases, the weight ratio of polyamide polymer to glass fibers ranges from 0.5:1 to 4.0:1. The compositions also comprise specific stabilizer packages that may, in some cases, comprise metal-based stabilizers, e.g., metal halides, in particular low amounts. The stabilizer packages employ specific combinations of metal-based stabilizers, e.g., copper iodide, non-copper metal halides such as potassium iodide, and/or potassium bromide, in low amounts (if any). For example, the compositions may use stabilizer packages that, when employed in the composition, provide only low amounts of copper metal to the composition, e.g., less than 0.06 wt % copper metal; or low amounts of non-copper metal halide compounds, e.g., from 1 ppb to 0.24 wt % non-copper metal halide compounds, such as potassium bromide or potassium iodide. Thus, the use of the high AEG polyamide and the stabilizer packages provides for superior performance, while minimizing the amounts of expensive metal stabilizers, e.g., copper-based compounds, that are required to achieve the aforementioned results, e.g., an impact resilience greater than 40 kJ/m$^2$, when hydrolysis aged for 500 hours at 130° C. and measured at 23° C.

The polyamide compositions disclosed herein, have other advantageous mechanical properties including a high impact energy loss (impact resilience), flexural strength at break, tensile strength at break, and tensile modulus.

The components of the polyamide composition are now discussed individually. It is contemplated that these components will be employed with one another to form the aforementioned polyamide compositions.

End Groups

As used herein, amine end groups are defined as the quantity of amine ends (—NH$_2$) present in a polyamide. AEG calculation methods are well known. In some cases a theoretical AEG content is employed. The theoretical AEG content may be calculated by considering the end group levels of all of the polyamides that are included in the polyamide compositions and calculating the AEG content based on weighted average.

The disclosed amide polymers utilize particular ranges and/or limits of (theoretical) AEG levels. In some embodiments, the amide polymer has an AEG level ranging from 50 µeq/gram to 90 µeq/gram, e.g., from 55 µeq/gram to 85 µeq/gram, from 60 µeq/gram to 90 µeq/gram, from 70 µeq/gram to 90 µeq/gram from 74 µeq/gram to 89 µeq/gram, from 52 µeq/gram to 92 µeq/gram, from 55 µeq/gram to 92 µeq/gram, from 60 µeq/gram to 85 µeq/gram, from 62 µeq/gram to 82 µeq/gram, from 76 µeq/gram to 87 µeq/gram, 78 µeq/gram to 85 µeq/gram, from 60 µeq/gram to 80 µeq/gram, from 62 µeq/gram to 78 µeq/gram, from 65 µeq/gram to 75 µeq/gram, or from 67 µeq/gram to 73. In terms of lower limits, the base polyamide composition may have a (theoretical) AEG level greater than 50 µeq/gram, e.g., greater than 55 µeq/gram, greater than 57 µeq/gram, greater than 60 µeq/gram, greater than 62 µeq/gram, greater than 65 µeq/gram, greater than 67 µeq/gram, greater than 70 µeq/gram, greater than 72 µeq/gram, greater than 74 µeq/gram, greater than 75 µeq/gram, greater than 76 µeq/gram or greater than 78 µeq/gram. In terms of upper limits, the base polyamide composition may have an AEG level less than 90 µeq/gram, e.g. less than 89 µeq/gram, less than 87 µeq/gram, less than 85 µeq/gram, less than 80 µeq/gram, less than 78 µeq/gram, less than 75 µeq/gram, less than 70 µeq/gram, less than 65 µeq/gram, less than 63 µeq/gram, or less than 60 µeq/gram. Again, the utilization of the specific AEG levels provides for the unexpected combination of hydrolysis age resilience, e.g., tensile strength and/or impact resilience (among others).

In some embodiments, the polyamide polymer comprises from 35 µeq/gram to 100 µeq/gram amine end groups (theoretical), e.g., from 50 µeq/gram to 100 µeq/gram, from 40 µeq/gram to 85 µeq/gram, from 53 µeq/gram to 97 µeq/gram, from 52 µeq/gram to 92 µeq/gram, from 55 µeq/gram to 92 µeq/gram, from 60 µeq/gram to 85 µeq/gram, from 62 µeq/gram to 82 µeq/gram, from 55 µeq/gram to 95 µeq/gram, from 58 µeq/gram to 92 µeq/gram, from 60 µeq/gram to 90 µeq/gram, from 63 µeq/gram to 88 µeq/gram, from 65 µeq/gram to 88 µeq/gram, from 68 µeq/gram to 87 µeq/gram, from 70 µeq/gram to 85 µeq/gram, from 70 µeq/gram to 80 µeq/gram, from 74 µeq/gram to 80 µeq/gram, from 72 µeq/gram to 82 µeq/gram, or from 74 µeq/gram to 80 µeq/gram. In terms of lower limits, the polyamide polymer may comprise greater than 35 µeq/gram amine end groups, e.g., greater than 50 µeq/gram, greater than 52 µeq/gram, greater than 53 µeq/gram, greater than 55 µeq/gram, greater than 58 µeq/gram, greater than 60 µeq/gram, greater than 62 µeq/gram, greater than 63 µeq/gram, greater than 65 µeq/gram, greater than 68 µeq/gram, greater than 70 µeq/gram, greater than 72 µeq/gram, or greater than 74 µeq/gram, In terms of upper limits, the polyamide polymer may comprise less than 100 µeq/gram amine end groups, e.g., less than 97 µeq/gram, less than 95 µeq/gram, less than 92 µeq/gram, less than 90 µeq/gram, less than 88 µeq/gram, less than 87 µeq/gram, less than 85 µeq/gram, less than 82 µeq/gram, or less than 80 µeq/gram.

The AEG content may be obtained/achieved/controlled by treating a conventional lower AEG content polyamide, non-limiting examples of which are provided below. In some cases, AEG level may be obtained/achieved/controlled by controlling the amount of excess hexamethylene diamine (HMD) in the polymerization reaction mixture. HMD is believed to be more volatile than the (di)carboxylic acids that are employed in the reaction, e.g. adipic acid. Generally, the excess HMD in the reaction mixture ultimately affects the level of the AEGs. In some cases, the AEG level may be obtained/achieved/controlled via the incorporation of (mono) amines, e.g., by "capping" some of the end structures with amines, and the monofunctional end capping may be employed to arrive at the aforementioned high AEG level amide polymers.

Exemplary (mono) amines include but are not limited to benzylamine, ethylamine, propylamine, butylamine, pentylamine, hexylamine, 2-ethyl-1-hexylamine, heptylamine, octylamine, nonylamine, decylamine, undecylamine, dodecylamine, amylamine, tert-butyl amine, tetradecylamine, hexadecylamine, or octadecylamine, or any combinations thereof. Exemplary (mono) acids include but are not limited to acetic acid, proprionic acid, butyric acid, valeric acid, hexanoic acid, octanoic acid, palmitic acid, myristic acid, decanoic acid, undecanoic acid, dodecanoic acid, oleic acid, or stearic acid, or any combinations thereof.

The one or more polyamides each independently have a specific configuration of end groups, such as, for example, amine end groups, carboxylate end groups and so-called inert end groups including mono-carboxylic acids, mono amines, lower dicarboxylic acids capable of forming inert imine end groups, phthalic acids and derivatives thereof. Importantly, it has been found that in some aspects, the polymer end groups can be selected to specifically interact with the other components of the composition, to synergistically provide for unexpected improvements in chemical properties, e.g., hydrolysis resistance, and/or mechanical properties, e.g., tensile strength. Importantly, the inventors have discovered that higher concentrations of end groups retard hydrolysis-degrading reactions, which are often times acid-catalyzed reactions. The presence of higher amounts of end groups, and lower concentrations of acid end groups, has been found to reduce the rate at which the hydrolysis-degrading reactions proceed.

In some cases, the polyamide polymer comprises multiple polyamides, each having different AEG content. In such cases, the polyamide polymer may have an overall (combined) theoretical end group content as discussed herein. In some cases, one or more of the polyamides may have a low AEG content and other polyamides may have a high AEG content, however, the overall theoretical end group content is at the high levels disclosed herein.

Polyamide Polymer

As noted above, the disclosed heat-stabilized polyamide compositions comprise an amide polymer having a high amounts of AEG (high AEG polyamides). The polyamide itself, e.g., the base polyamide that may be treated to form the high AEG polyamide), may vary widely. In some cases, a polyamide may be processed to achieve the high AEG content (exemplary techniques are noted above).

Many varieties of natural and artificial polyamides are known and may be utilized in the formation of the high AEG polyamide. Common polyamides include nylons and aramids. For example, the polyamide may comprise PA-4T/4I; PA-4T/6I; PA-5T/5I; PA-6; PA-6,6; PA-6,6/6; PA-6,6/6T; PA-6T/6I; PA-6T/6I/6; PA-6T/6; PA-6T/6I/66; PA-6T/MPDMT (where MPDMT is polyamide based on a mixture of hexamethylene diamine and 2-methylpentamethylene diamine as the diamine component and terephthalic acid as the diacid component); PA-6T/66; PA-6T/610; PA-10T/612; PA-10T/106; PA-6T/612; PA-6T/10T; PA-6T/10I; PA-9T; PA-10T; PA-12T; PA-10T/10I; PA-10T/12; PA-10T/11; PA-6T/9T; PA-6T/12T; PA-6T/10T/6I; PA-6T/6I/6; PA-6T/6I/12; and combinations thereof.

The polyamide polymer of the disclosed compositions can vary widely and can include one polyamide polymer or two or more polyamides. Exemplary polyamide polymers and polyamide polymer-containing compositions are described in Kirk-Othmer, Encyclopedia of Chemical Technology, Vol. 18, pp. 328-371 (Wiley 1982), the disclosure of which is incorporated by reference. Briefly, polyamides are products that contain recurring amide groups as integral parts of the main polymer chains. Linear polyamides are of particular interest and may be formed from condensation of bifunctional monomers as is well known in the art. Polyamides are frequently referred to as nylons. Particular polyamide polymers and copolymers and their preparation are described in, for example, U.S. Pat. Nos. 2,071,250; 2,071,251; 2,130,523; 2,130,948; 2,241,322; 2,312,966; 2,512,606; 3,236,914; 3,472,916; 3,373,223; 3,393,210; 3,984,497; 3,546,319; 4,031,164; 4,320,213; 4,346,200; 4,713,415; 4,760,129; 4,981,906; 5,504,185; 5,543,495; 5,698,658; 6,011,134; 6,136,947; 6,169,162; 6,197,855; 7,138,482; 7,381,788; and 8,759,475, each of which is incorporated by reference in entirety for all purposes.

The one or more polyamide polymers of the composition can include aliphatic polyamides such as polymeric E-caprolactam (PA6) and polyhexamethylene adipamide (PA66) or other aliphatic nylons, polyamides with aromatic components such as paraphenylenediamine and terephthalic acid, and copolymers such as adipate with 2-methyl pentamethylene diamine and 3,5-diacarboxybenzenesulfonic acid or sulfoisophthalic acid in the form of its sodium sultanate salt. The polyamides can include polyaminoundecanoic acid and polymers of bis-paraaminocyclohexyl methane and undecanoic acid. Other polyamides include poly(aminododecanoamide), polyhexamethylene sebacamide, poly(p-xylyleneazeleamide), poly(m-xylylene adipamide), and polyamides from bis(p-aminocyclohexyl)methane and azelaic, sebacic and homologous aliphatic dicarboxylic acids.

As used herein, the terms "PA6 polymer" and "PA6 polyamide polymer" also include copolymers in which PA6 is the major component. As used herein the terms "PA66 polymer" and "PA66 polyamide polymer" also include copolymers in which PA66 is the major component. In some embodiments, copolymers such as PA-6,6/6I; PA-6I/6T; or PA-6,6/6T, or combinations thereof are contemplated for use as the polyamide polymer. In some cases, physical blends, e.g., melt blends, of these polymers are contemplated. In one embodiment, the polyamide polymer comprises PA-6, or PA-6,6, or a combination thereof.

The polyamide compositions can include polyamides produced through the ring-opening polymerization or polycondensation, including the copolymerization and/or copolycondensation, of lactams. These polyamides can include, for example, those produced from propriolactam, butyrolactam, valerolactam, and caprolactam. For example, in some embodiments, the composition includes a polyamide polymer derived from the polymerization of caprolactam.

In certain aspects, the one or more polyamide polymers includes a PA66 polymer. PA66 has a rapid crystallization rate and high temperature performance versus other engineering resins such as polyethylene terephthalate (PET), conveying significant advantages for use in injection molding. In some embodiments, the polyamide polymer comprises PA6 or PA66 or combinations thereof. In some embodiments, the polyamide polymer comprises (only) PA66.

The polyamide composition can include a combination of polyamides. By combining various polyamides, the final composition can incorporate the desirable properties, e.g., mechanical properties, of each constituent polyamides. The combination of polyamides could include any number of known polyamides. In some embodiments, the polyamide composition includes a combination of PA6 and PA66, preferably present in the amounts discussed herein. The polyamide composition can also generally employ combinations of any of the weight percentages described herein.

The concentration of the polyamide polymer having high overall AEG content in the polyamide composition can, for example, range from 5 wt % to 85 wt %, e.g., from 30 wt % to 80 w %, from 40 wt % to 75 wt %, from 50 wt % to 85 wt %, from 55 wt % to 78 wt %, from 60 wt % to 75 wt %, from 61 wt % to 73 wt %, from 62 wt % to 72 wt %, from 66 wt % to 68 wt %, from 45 wt % to 70 wt %, from 47 wt % to 65 wt %, or from 47.5 wt % to 63.5 wt %. In terms of upper limits, the combined polyamide polymer concentration can be less than 85 wt %, e.g., less than 80 wt %, less than 78 wt %, less than 75 wt %, less than 72 wt %, less than 70 wt %, less than 68 wt %, less than 65 wt %, or less than 63.5 wt %. In terms of lower limits, the combined polyamide polymer concentration can be greater than 5 wt %, e.g., greater than 30 wt %, greater than 40 wt %, greater than 42 wt %, greater than 45 wt %, greater than 47 wt %, greater than 47.5 wt %, greater than 50 wt %, greater than 55 wt %, greater than 60 wt %, greater than 62 wt %, or greater than 66 wt %. Lower concentrations, e.g., less than 5 wt %, and higher concentrations, e.g., greater than 85 wt %, are also contemplated.

The concentration of the polyamide polymer in the polyamide composition can, for example, range from 35 wt % to 85 wt %, e.g., from 40 wt % to 85 w %, from 45 wt % to 80 wt %, from 50 wt % to 80 wt %, from 55 wt % to 75 wt %, from 55 wt % to 72 wt %, from 60 wt % to 70 wt %, from 58 wt % to 68 wt %, or from 59 wt % to 67 wt %. In terms of upper limits, the combined polyamide polymer concentration can be less than 85 wt %, e.g., less than 80 wt %, less than 75 wt %, less than 68 wt %, or less than 67 wt %. In terms of lower limits, the combined polyamide polymer concentration can be greater than 35 wt %, e.g., greater than 40 wt %, greater than 45 wt %, greater than 50 wt %, greater than 55 wt %, greater than 58 wt %, or greater than 59 wt %.

The concentration of the polyamide polymer in the polyamide composition can, for example, range from 25 wt % to 75 wt %, e.g., from 30 wt % to 70 w %, from 35 wt % to 65 wt %, from 40 wt % to 60 wt %, from 45 wt % to 50 wt %, from 45 wt % to 51 wt %, from 45 wt % to 55 wt %, from 45 wt % to 51 wt %, from 46 wt % to 50 wt %, or from 47 wt % to 49 wt %. In terms of upper limits, the combined polyamide polymer concentration can be less than 75 wt %, e.g., less than 70 wt %, less than 65 wt %, less than 60 wt %, less than 50 wt % or less than 49 wt %. In terms of lower limits, the combined polyamide polymer concentration can be greater than 25 wt %, e.g., greater than 30 wt %, greater than 35 wt %, greater than 40 wt %, greater than 45 wt %, greater than 46 wt %, or greater than 47 wt %.

In some cases, the polyamide polymer comprises a first polyamide and a second polyamide (and/or additional polyamides). The first polyamide may have a high theoretical amine end group content, e.g., ranging from 65 µeq/gram to 100 µeq/gram, e.g., from 70 µeq/gram to 95 µeq/gram, from 75 µeq/gram to 90 µeq/gram, or from 78 µeq/gram to 85 µeq/gram. In terms of lower limits, the first polyamide may have a theoretical amine end group content greater than 65 µeq/gram, e.g., greater than 70 µeq/gram, greater than 75 µeq/gram, or greater than 78 µeq/gram. In terms of upper limits, the first polyamide may have a theoretical amine end group content less than 100 µeq/gram, e.g., less than 95 µeq/gram, less than 90 µeq/gram, or less than 85 µeq/gram.

The polyamide polymer may comprise the first polyamide in an amount ranging from 20 wt % to 80 wt %, e.g., from 25 wt % to 75 w %, from 27 wt % to 72 wt %, from 30 wt % to 70 wt %, or from 33 wt % to 67 wt %. In terms of lower limits, the polyamide polymer may comprise the first polyamide in an amount less than 80 wt %, e.g., less than 75 wt %, less than 72 wt %, less than 70 wt %, or less than 67 wt %. In terms of upper limits, the polyamide polymer may comprise the first polyamide in an amount greater than 25 wt %, e.g., greater than 27 wt %, greater than 30 wt %, or greater than 33 wt %.

The second polyamide may have a low theoretical amine end group content ranging from 20 µeq/gram to 49 µeq/gram, e.g., from 25 µeq/gram to 49 µeq/gram, from 35 µeq/gram to 49 µeq/gram, or from 44 µeq/gram to 49 µeq/gram. In terms of lower limits, the second polyamide may have a theoretical amine end group content greater than 20 µeq/gram, e.g., greater than 25 µeq/gram, greater than 35 µeq/gram, or greater than 44 µeq/gram. In terms of upper limits, the second polyamide may have a theoretical amine end group content less than 49.5 µeq/gram, e.g., less than 49 µeq/gram, less than 48 µeq/gram, or less than 45 µeq/gram.

The use of multiple polymers is advantageous because it allows for the use of blends to adjust or tune the overall theoretical AEG content, as opposed to using a single polyamide component, as is done in conventional applications.

The polyamide polymer may comprise the second polyamide in an amount ranging from 0 wt % to 50 wt %, e.g., from 5 wt % to 40 w %, from 10 wt % to 38 wt %, from 12 wt % to 35 wt %, or from 16 wt % to 33 wt %. In terms of lower limits, the polyamide polymer may comprise the second polyamide in an amount less than 50 wt %, e.g., less than 40 wt %, less than 38 wt %, less than 35 wt %, or less than 33 wt %. In terms of upper limits, the polyamide polymer may comprise the second polyamide in an amount greater than 0 wt %, e.g., greater than 5 wt %, greater than 10 wt %, greater than 12 wt %, or greater than 16 wt %.

In cases where the polyamide composition comprises PA6 or PA66 or a combination thereof or where the polyamide composition comprises (only) PA66, the aforementioned ranges and limits are applicable.

In some embodiments, one or more low melt temperature polyamides are utilized, e.g., a polyamide having a melt temperature below 210° C., e.g., below 206° C., below 202° C., below 198° C., below 194° C., below 190° C., below 186° C., below 182° C., below 178° C., or below 174° C. The melt temperature of the one or more polyamides can each independently, for example, range from 170° C. to 210° C., e.g., from 170° C. to 194° C., from 174° C. to 198° C., from 178° C. to 202° C., from 182° C. to 206° C., or from 186° C. to 210° C. In terms of lower limits, the melt temperature of each of the polyamides can be greater than 170° C., e.g., greater than 174° C., greater than 178° C., greater than 182° C., greater than 186° C., greater than 190° C., greater than 194° C., greater than 198° C., greater than 202° C., or greater than 206° C. Higher melt temperatures, e.g., greater than 210° C., and lower melt temperatures, e.g., less than 170° C., are also contemplated.

In addition to the compositional make-up of the polyamide mixture, it has also been discovered that the relative viscosities of the polyamide polymer can provide surprising benefits, both in performance and processing. For example, if the relative viscosity of the amide polymer is within certain ranges and/or limits, production rates and tensile strength (and optionally impact resilience) are improved. As described herein, "relative viscosity" or "RV" refers to a comparison of the viscosity of a solution of polymer in formic acid with the viscosity of the formic acid itself, and is measured using 90% formic acid and glass capillary Ubbelohde viscometers according to the standard protocol ASTM D789-18 (2018). For samples containing fiberglass or other fillers, the weight of sample to be dissolved is adjusted according to the amount of filler to provide the required 11.0 grams of neat resin per 100 ml formic acid. Solutions containing such fillers are filtered before loading into the viscometer.

The relative viscosity of the polyamide polymer can each independently or collectively, in some embodiments, range from 5 to 150, e.g., from 10 to 100, from 20 to 80, from 25 to 75, from 30 to 60, from 40 to 55, from 36 to 55, from 40 to 50, from 42 to 50, or from 44 to 48. In terms of upper limits, the polyamide polymer relative viscosity can be less than 150, e.g., less than 100, less than 80, less than 75, less than 60, less than 55, less than 50, or less than 48. In terms of lower limits, the polyamide polymer relative viscosity can be greater than 5, e.g., greater than 10, greater than 20, greater than 25, greater than 30, greater than 40, greater than 42, or greater than 44. Higher relative viscosities, e.g., greater than 150, and lower relative viscosities, e.g., less than 5, are also contemplated. In some cases, beginning with a higher relative viscosity provides for better performance because it takes longer for the polymer to degrade to a lower relative viscosity/lower molecular weight level.

The number average molecular weight of the one or more polyamide polymers in the polyamide composition can each independently, for example, range from 10,000 Daltons to 100,000 Daltons, e.g., from 10,000 Daltons to 64,000 Daltons, from 19,000 Daltons to 73,000 Daltons, from 28,000 Daltons to 82,000 Daltons, from 37,000 Daltons to 91,000 Daltons, or from 46,000 Daltons to 100,000 Daltons. In terms of upper limits, the molecular weight of each of the polyamide polymers can independently be less than 100,000 Daltons, e.g., less than 91,000 Daltons, less than 82,000 Daltons, less than 73,000 Daltons, less than 64,000 Daltons, less than 55,000 Daltons, less than 46,000 Daltons, less than 37,000 Daltons, less than 28,000 Daltons, or less than 19,000 Daltons. In terms of lower limits, the molecular weight of each of the polyamide polymers can independently be greater than 10,000 Daltons, e.g., greater than 19,000 Daltons, greater than 28,000 Daltons, greater than 37,000 Daltons, greater than 46,000 Daltons, greater than 55,000 Daltons, greater than 64,000 Daltons, greater than 73,000 Daltons, greater than 82,000 Daltons, or greater than 91,000 Daltons. Higher molecular weights, e.g., greater than 100,000 Daltons, and smaller molecular weights, e.g., less than 10,000 Daltons, are also contemplated.

In some embodiments, each of the one or more polyamide polymers is crystalline or semi-crystalline. In some embodiments, each of the one or more polyamide polymers is crystalline. In some embodiments, each of the one or more polyamide polymers is semi-crystalline.

Glass Fibers

The polyamide composition includes a reinforcing filler, e.g., glass fibers. The glass fibers can include soda lime silicate, zirconium silicates, calcium borosilicates, alumina-calcium borosilicates, calcium aluminosilicates, magnesium aluminosilicates, or combinations thereof. The glass fibers can include long fibers, e.g., greater than 6 mm, short fibers, e.g., less than 6 mm, or combinations thereof. The glass fiber can be milled.

The amount of glass fibers in the polyamide composition relative to the amounts of the other composition components can be selected as disclosed herein to advantageously provide additional strength without negatively affecting other preferred characteristics, e.g., hydrolysis resistance.

Importantly, it has been discovered that the weight ratio of polyamide polymer to glass fibers may be critical in providing the synergistic combinations of performance features disclosed herein.

The concentration of glass fibers in the polyamide composition can, in some embodiments, range from 25 wt % to 60 wt %, e.g., from 28 wt % to 57 wt %, from 30 wt % to 55 wt %, from 32 wt % to 53 wt %, from 30 wt % to 55 wt %, or from 35 wt % to 51 wt %. In terms of upper limits, the glass fiber concentration can be less than 60 wt %, e.g., less than 57 wt %, less than 55 wt %, less than 53 wt %, or less than 51 wt %. In terms of lower limits, the glass fiber concentration can be greater than 25 wt %, e.g., greater than 28 wt %, greater than 30 wt %, greater than 32 wt %, or greater than 35 wt %. Lower concentrations, e.g., less than 25 wt %, and higher concentrations, e.g., greater than 60 wt %, are also contemplated.

The concentration of glass fibers in the polyamide composition can, in some embodiments, range from 25 wt % to 50 wt %, e.g., from 25 wt % to 35 wt %, from 27 wt % to 33 wt %, from 28 wt % to 48 wt %, from 28 wt % to 45 wt %, from 30 wt % to 43 wt %, from 30 wt % to 40 wt %, from 32 wt % to 38 wt %, or from 33 wt % to 37 wt %. In terms of upper limits, the glass fiber concentration can be less than 50 wt %, e.g., less than 48 wt %, less than 45 wt %, less than 43 wt %, less than 40 wt %, less than 38 wt %, less than 37 wt %, or less than 35 wt %. In terms of lower limits, the glass fiber concentration can be greater than 25 wt %, e.g., greater than 28 wt %, greater than 30 wt %, greater than 32 wt %, or greater than 33 wt %. Lower concentrations, e.g., less than 25 wt %, and higher concentrations, e.g., greater than 50 wt %, are also contemplated.

The concentration of glass fibers in the polyamide composition can, in some embodiments, range from 25 wt % to 85 wt %, e.g., from 25 wt % to 75 wt %, from 30 wt % to 70 wt %, from 35 wt % to 65 wt %, from 40 wt % to 60 wt %, from 45 wt % to 55 wt %, or from 46 wt % to 52 wt %. In terms of upper limits, the glass fiber concentration can be less than 85 wt %, e.g., less than 75 wt %, less than 70 wt %, less than 65 wt %, less than 60 wt %, less than 55 wt %, or less than 53 wt %. In terms of lower limits, the glass fiber concentration can be greater than 25 wt %, e.g., greater than 30 wt %, greater than 35 wt %, greater than 40 wt %, greater than 45 wt %, or greater than 47 wt %. Lower concentrations, e.g., less than 25 wt %, and higher concentrations, e.g., greater than 85 wt %, are also contemplated.

The weight ratio of the one or more polyamide polymers to glass fiber in the polyamide composition can, for example, range from 0.1 to 10, e.g., from 0.1 to 1.6, from 0.16 to 2.5, from 0.25 to 4, from 0.4 to 6.3, or from 0.63 to 10. In terms of upper limits, the weight ratio of the one or more polyamide polymers to glass fiber can be less than 10, e.g., less than 6.3, less than 4, less than 2.5, less than 1.6, less than 1, less than 0.63, less than 0.4, less than 0.25, or less than 0.16. In terms of lower limits, the weight ratio of the one or more polyamide polymers to glass fiber can be greater than 0.1, e.g., greater than 0.16, greater than 0.25, greater than 0.4, greater than 0.63, greater than 1, greater than 1.6, greater than 2.5, greater than 4, or greater than 6.3. Lower ratios, e.g., less than 0.1, and higher ratios, e.g., greater than 10, are also contemplated.

In some embodiments, the weight ratio of polyamide polymer to glass fibers is at least 0.5:1, e.g., at least 0.6:1, at least 0.7:1, at least 0.8:1, or at least 0.9:1. In terms of ranges, the weight ratio of polyamide polymer to glass fibers may range from 0.5:1 to 20.0:1, e.g., from 0.5:1 to 10.0:1, from 0.6:1 to 7.0:1, from 0.7:1 to 4.0:1, from 0.8:1 to 3.0:1, from 0.5:1 to 2:1, or from 0.9:1 to 2.0:1. In terms of upper limits, the weight ratio of polyamide polymer to glass fibers is less than 20.0:1, e.g., less than 10.0:1, less than 7.0:1, less than 4.0:1, less than 3.0:1, or less than 2.0:1.

In some embodiments, the weight ratio of polyamide polymer to glass fibers is at least 0.5:1, e.g., at least 0.7:1, at least 0.9:1, at least 1.0:1, at least 1.2:1, at least 1.5:1, or at least 1.7:1. In terms of ranges, the weight ratio of polyamide polymer to glass fibers may range from 0.5:1 to 5.0:1, e.g., from 0.5:1 to 4.0:1, from 0.6:1 to 3.5:1, from 0.7:1 to 3.0:1, from 0.8:1 to 2.7:1, from 1.0:1 to 2.4:1, from 1.2:1 to 2.2:1, from 1.4:1 to 2.0:1, or from 1.5:1 to 1.9:1. In terms of upper limits, the weight ratio of polyamide polymer to glass fibers is less than 5.0:1, e.g., less than 4.0:1, less than 3.5:1, less than 3.0:1, less than 2.7:1, less than 2.4:1, less than 2.2:1, less than 2.0:1, or less than 1.9:1.

In some embodiments, the weight ratio of polyamide polymer to glass fibers is at least 0.5:1, e.g., at least 0.6:1, at least 0.7:1, at least 0.8:1, or at least 0.9:1. In terms of ranges, the weight ratio of polyamide polymer to glass fibers may range from 0.5:1 to 5.0:1, e.g., from 0.5:1 to 3.0:1, from 0.6:1 to 2.0:1, from 0.7:1 to 1.7:1, from 0.8:1 to 1.5:1, or from 0.8:1 to 1.2:1. In terms of upper limits, the weight ratio of polyamide polymer to glass fibers is less than 5.0:1, e.g., less than 3.0:1, less than 2.0:1, less than 1.7:1, less than 1.5:1, or less than 1.2:1.

In some embodiments, the polyamide composition comprises low amounts, if any, of lamellar mineral reinforcing materials, e.g., mica. It has been discovered that the use of these amounts, surprisingly provide for a product that demonstrates the aforementioned combination of features.

In some embodiments, the polyamide composition comprises from 0.01 wt % to 45.0 wt % lamellar mineral reinforcing materials, e.g., from 0.01 wt % to 35 wt %, from 0.1 wt % to 35.0 wt %, from 0.5 wt % to 30.0 wt %, from 0.5 wt % to 25.0 wt %, from 1.0 wt % to 20.0 wt %, from 1.0 wt % to 10 wt %, from 0.5 wt % to 7 wt %, or from 1.0 wt % to 5.0 wt %. In terms of upper limits, the polyamide composition may comprise less than 45.0 wt % lamellar mineral reinforcing materials, e.g., less than 35.0 wt %, less than 30.0 wt %, less than 25.0 wt %, less than 20.0 wt %, less than 15.0 wt %, less than 10.0 wt %, less than 7.0 wt %, less than 5.0 wt %, less than 3.0 wt %, less than 1.0 wt %, or less than 0.5 wt %. In terms of lower limits, the polyamide composition may comprise greater than 0.01 wt % lamellar mineral reinforcing materials, e.g., greater than 0.1 wt %, greater than 0.5 wt %, greater than 1.0 wt %, or greater than 5.0 wt %.

Heat Stabilizer Package

The one or more heat stabilizers of the polyamide composition have been found to improve performance, e.g., at higher operating temperatures, of the composition without significantly negatively affecting the strength or ductility of the material, and while reducing or eliminating the need for expensive metal stabilizers, e.g., copper-based compounds. The heat stabilizer can include, for example, hindered phenolic stabilizers, phosphite-based stabilizers, hindered amine-based stabilizers, triazine-based stabilizers, sulfur-based stabilizers, metal-based stabilizers (in low amounts), or combinations thereof. In some cases, the heat stabilizer package beneficially has a low copper or copper-based compound content. In some cases, the heat stabilizer package is copper-free.

The stabilizer packages, in some cases, comprise metal-based stabilizers, e.g., metal halides, in particular low amounts. The stabilizer packages employ specific combinations of metal-based stabilizers, e.g., non-copper metal halides such as potassium iodide, potassium bromide, and/or copper iodide, in low amounts (if any).

The copper-based stabilizers, if present, may be present in (low) amounts if any, for example, from 0 wt % to 0.03 wt %, e.g., from 0 wt % to 0.026 wt %, from 10 ppm to 0.020 wt %, or from 25 ppm to 0.015 wt %. In terms of upper limits, the copper based stabilizer may be present in an amount less than 0.03 wt %, e.g., less than 0.026 wt %, less than 0.020 wt %, or less than 0.015 wt %. In terms of lower limits, the copper based stabilizer may be present in an amount greater than 0 wt %, e.g., greater than 10 ppm, greater than 25 ppm, or greater than 50 ppm. In some embodiments, the heat stabilizer package (and the polyamide composition) comprise no copper-based stabilizer, which provides for significant cost and/or processing advantages.

Copper-based stabilizers, if used, may include copper halides, e.g., chlorides, bromides, iodides. Copper stabilizers also can include copper cyanide, copper oxide, copper sulfate, copper phosphate, copper acetate, copper propionate, copper benzoate, copper adipate, copper terephthalate, copper isophthalate, copper salicylate, copper nicotinate, copper stearate, and copper complex salts coordinated to a chelating amine such as ethylenediamine and ethylenediaminetetraacetic acid.

The polyamide compositions, in some embodiments, may comprises low amounts of copper metal (as a result of the addition of the low amounts of copper-based compound), e.g., less than 0.06 wt % copper metal, e.g., less than 0.05 wt %, less than 0.03 wt %, less than 0.01 wt %, or less than 0.005 wt %. In terms of ranges, the compositions may comprises from 0 ppm to 0.06 wt % copper metal, e.g., from 0 ppm to 0.01 wt %, from 10 ppm to 0.05 wt %, or from 10 ppm to 0.03 wt %. In some embodiments, the heat stabilizer package (and the polyamide composition) comprise no copper, which provides for significant cost and/or processing advantages.

In some embodiments, the stabilizer packages, when employed in the composition, have low amounts of non-copper metal halide compounds. Non-copper metal halides are halides that do not comprise copper, e.g., are not copper halides. In some cases, the non-copper metal halides are alkali metal halides, e.g., sodium iodide, sodium bromide, potassium iodide, and potassium bromide. In some embodiments, the non-copper metal halide comprises potassium bromide, or potassium iodide, or combinations thereof.

In some embodiments, the polyamide compositions comprise from 0 wt % to 0.25 wt % non-copper metal halide compounds, e.g., from 1 ppb to 0.24 wt %, from 100 ppb to 0.24 wt %, from 1 ppm to 0.24 wt %, or from 50 ppm to 0.23 wt %. In terms of upper limits, the polyamide compositions may comprise less than 0.30 wt % non-copper metal halide compounds, e.g., less than 0.26 wt %, less than 0.24 wt %, or less than 0.23.

In some embodiments, the polyamide composition includes a cerium-based heat stabilizer, e.g., cerium oxide and/or cerium oxyhydrate.

The concentration of the heat stabilizer in the polyamide composition can, for example, range from 0.1 to 5 wt %, e.g., from 0.1 wt % to 1 wt %, from 0.15 wt % to 1.5 wt %, from 0.22 wt % to 2.3 wt %, from 0.32 wt % to 3.4 wt %, or from 0.48 wt % to 5 wt %. In some embodiments, the concentration of the heat stabilizer ranges from 0.2 wt % to 0.7 wt %. In terms of upper limits, the heat stabilizer concentration can be less than 5 wt %, e.g., less than 3.4 wt %, less than 2.3 wt %. less than 1.5 wt %, less than 1 wt %, less than 0.71 wt %, less than 0.48 wt %, less than 0.32 wt %, less than 0.22 wt %, or less than 0.15 wt %. In terms of lower limits, the heat stabilizer concentration can be greater than 0.1 wt %, e.g., greater than 0.15 wt %, greater than 0.22 wt %, greater than 0.32 wt %, greater than 0.48 wt %, greater than 0.71 wt %, greater than 1 wt %, greater than 1.5 wt %, greater than 2.3 wt %, or greater than 3.4 wt %. Lower concentrations, e.g., less than 0.1 wt %, and higher concentrations, e.g., greater than 5 wt %, are also contemplated.

In some embodiments, the heat stabilizer comprises copper or a copper-containing compound such as, for example, copper iodide. After combining the heat stabilizer with the other polyamide composition components, the concentration of copper in the polyamide composition can, for example, range from 25 ppm to 700 ppm, e.g., from 25 ppm to 180 ppm, from 35 ppm to 260 ppm, from 49 ppm to 360 ppm, from 68 ppm to 500 ppm, or from 95 ppm to 700 ppm. In terms of upper limits, the concentration of copper in the polyamide composition can be less than 700 ppm, e.g., less than 500 ppm, less than 360 ppm, less than 260 ppm, less than 180 ppm, less than 130 ppm, less than 95 ppm, less than 68 ppm, less than 49 ppm, or less than 35 ppm. In terms of lower limits, the concentration of copper in the polyamide composition can be greater than 25 ppm, e.g., greater than 35 ppm, greater than 49 ppm, greater than 68 ppm, greater than 95 ppm, greater than 130 ppm, greater than 180 ppm, greater than 260 ppm, greater than 360 ppm, or greater than 500 ppm. Higher concentrations, e.g., greater than 700 ppm, and lower concentrations, e.g., less than 25 ppm, are also contemplated.

In some embodiments, the polyamide composition comprises low amounts, if any, of heat stabilizers and/or scavengers, e.g., copper-based heat stabilizers. It has been discovered that the use of these components in these amounts, surprisingly provide for a product that demonstrates the aforementioned combination of features.

In one embodiment, the polyamide composition comprises less than 5.0 wt % heat stabilizers and/or scavengers, e.g., less than 4.0 wt %, less than 3.0 wt %, less than 2.5 wt %, less than 2.0 wt %, less than 1.5 wt %, less than 1.0 wt %, less than 0.5 wt %, or less than 0.1 wt %. In terms of lower limits, the polyamide composition may comprise greater than 0.001 wt % heat stabilizers and/or scavengers, e.g., greater than 0.01 wt %, greater than 0.05 wt %, greater than 0.1 wt %, greater than 0.5 wt %, greater than 1.0 wt %, greater than 2.0 wt %, or greater than 5.0 wt %. In terms of ranges, the polyamide composition may comprise heat stabilizers and/or scavengers in an amount ranging from 0.001 wt % to 5.0 wt %, e.g., from 0.01 wt % to 5.0 wt %, from 0.05 wt % to 4.0 wt %, from 0.05 wt % to 3.0 wt %, from 0.05 to 2.0 wt %, from 0.1 wt % to 3.0 wt %, or from 0.1 to 2.0 wt %.

In some embodiments, the heat stabilizer includes a copper-based heat stabilizer. In such cases, the copper-based heat stabilizer may be present in the amounts discussed in relation to the heat stabilizer, generally, e.g., less than 5.0 wt %, less than 4.0 wt %, less than 3.0 wt %, less than 2.5 wt %, less than 2.0 wt %, less than 1.5 wt %, less than 1.0 wt %, less than 0.5 wt %, or less than 0.1 wt %.

Additional stabilizers such as phenolic stabilizers, phosphite-based stabilizers, hindered amine-based stabilizers, and triazine-based stabilizers may also be employed.

Examples of hindered phenolic stabilizers include N,N'-hexane-1,6-diylbis[3-(3,5-ditert-butyl-4-hydroxyphenylpropionamide)]; pentaerythrityl-tetrakis[3-(3,5-di-tert-butyl-4-hydroxyphenyl)propionate]; N,N'-hexamethylene bis(3,5-di-tert-butyl-4-hydroxyhydrocinnamamide); triethyleneglycol-bis[3-(3-tert-butyl-5-methyl-4-hydroxyphenyl) propionate]; 3,9-bis{2-[3-(3-tert-butyl-4-hydroxy-5-methylphenyl)propionyloxy]-1,1-dimethylethyl}-2,4,8,10-tetraoxaspiro[5,5]undecane; 3,5-di-tert-butyl-4-hydroxybenzyl phosphonate-diethyl ester; 1,3,5-trimethyl-2,4,6-tris(3,5-di-tert-butyl-4-hydroxybenzyl)benzene; and 1,3,5-tris(4-tert-butyl-3-hydroxy-2,6-dimethylbenzyl)isocyanurate.

Examples of phosphite-based stabilizers include trioctyl phosphite; trilauryl phosphite; tridecyl phosphite; octyldiphenyl phosphite; trisisodecyl phosphite; phenyl diisodecyl phosphite; phenyl di(tridecyl)phosphite; diphenyl isooctyl phosphite; diphenyl isodecyl phosphite; diphenyl(tridecyl) phosphite; triphenyl phosphite; tris(nonyl phenyl) phosphite; tris(2,4-di-tert-butyl phenyl) phosphite; tris(2,4-di-tert-butyl-5-methyl phenyl) phosphite; tris(butoxyethyl) phosphite; 4,4'-butylidene-bis(3-methyl-6-tertbutylphenyl-tetra-tridecyl)diphosphite; tetra($C_{12}$- to $C_{15}$-mixed alkyl)-4,4'-isopropylidenediphenyl diphosphite; 4,4'-isopropylidenebis(2-tert-butylphenyl)-di(nonylphenyl) phosphite; tris(biphenyl)phosphite; tetra(tridecyl)-1,1,3-tris (2-methyl-5-tertbutyl-4-hydroxyphenyl)butane diphosphite; tetra(tridecyl)-4,4'-butylidenebis(3-methyl-6-tert-butylphenyl)diphosphite; tetra($C_1$- to $C_{15}$-mixed alkyl)-4,4'-isopropylidenediphenyl diphosphite; tris(mono-/di-mixed nonylphenyl)phosphite; 4,4'-isopropylidenebis(2-tertbutylphenyl)-di(nonylphenyl)phosphite; 9,10-di-hydro-9-oxa-10-phosphorphenanthrene-10-oxide; tris(3,5-di-t-butyl-4-hydroxyphenyl)phosphite; hydrogenated-4,4'-isopropylidenediphenyl polyphosphite; bis(octylphenyl)-bis (4,4'-butylidenebis(3-methyl-6-tert-butyl phenyl)-1,6-hexanol diphosphite; hexa(tridecyl)-1,1,3-tris(2-methyl-4-hydroxy-5-tert-butylphenyl)butane triphosphite; tris(4,4'-isopropylidenebis(2-tertbutylphenyl) phosphite; tris(1,3-stearoyloxyisopropyl)phosphite; 2,2-methylenebis(4,6-ditert-butylphenyl)octyl phosphite; 2,2-methylenebis(3-methyl-4,6-di-tert-butylphenyl)-2-ethylhexyl phosphite; tetrakis(2,4-di-tert-butyl-5-methylphenyl)-4,4'-biphenylene diphosphite; and tetrakis(2,4-di-tert-butyl phenyl)-4,4'-biphenylene diphosphite.

Phosphite-based stabilizers also include pentaerythritol-type phosphite compounds, such as 2,6-di-tert-butyl-4-methylphenyl-phenyl-pentaerythritol diphosphite; 2,6-di-tert-butyl-4-methylphenyl-methyl-pentaerythritol diphosphite; 2,6-di-tert-butyl-4-methylphenyl-2-ethylhexyl-pentaerythritol diphosphite; 2,6-di-tert-butyl-4-methylphenylisodecyl-pentaerythritol diphosphite; 2,6-di-tert-butyl-4-methylphenyl-laurylpentaerythritol diphosphite; 2,6-di-tert-butyl-4-methylphenyl-isotridecyl-pentaerythritol diphosphite; 2,6-di-tert-butyl-4-methyl phenyl-stearyl-pentaerythritol diphosphite; 2,6-ditert-butyl-4-methyl phenyl-cyclohexyl-pentaerythritol diphosphite; 2,6-di-tert-butyl-4-methylphenyl-benzyl-pentaerythritol diphosphite; 2,6-di-tert-butyl-4-methylphenyl-ethylcellosolve-pentaerythritol diphosphite; 2,6-di-tert-butyl-4-methylphenyl-butylcarbitol-pentaerythritol diphosphite; 2,6-di-tert-butyl-4-methylphenyl-octylphenyl-pentaerythritol diphosphite; 2,6-di-tert-butyl-4-methylphenyl-nonylphenyl-pentaerythritol diphosphite; bis(2,6-di-tert-butyl-4-methyl phenyl)pentaerythritol diphosphite; bis(2,6-di-tert-butyl-4-ethylphenyl)pentaerythritol diphosphite; 2,6-di-tert-butyl-4-methylphenyl-2, 6-di-tertbutylphenyl-pentaerythritol diphosphite; 2,6-di-tert-butyl-4-methylphenyl-2,4-di-tertbutylphenyl-pentaerythritol diphosphite; 2,6-di-tert-butyl-4-methylphenyl-2,4-di-tertoctylphenyl-pentaerythritol diphosphite; 2,6-di-tert-butyl-4-methylphenyl-2-cyclohexylphenyl-pentaerythritol diphosphite; 2,6-di-tert-amyl-4-methylphenyl-phenyl-pentaerythritol diphosphite; bis(2,6-di-tert-amyl-4-methylphenyl)pentaerythritol diphosphite; and bis(2,6-di-tert-octyl-4-methylphenyl)pentaerythritol diphosphite.

Examples of hindered amine-based stabilizers include 4-acetoxy-2,2,6,6-tetra methyl piperidine; 4-stearoyloxy-2,2,6,6-tetramethylpiperidine; 4-acryloyloxy-2,2,6,6-tetramethylpiperidine; 4-(phenylacetoxy)-2,2,6,6-tetramethylpiperidine; 4-benzoyloxy-2,2,6,6-tetramethylpiperidine; 4-methoxy-2,2,6,6-tetramethylpiperidine; 4-stearyloxy-2,2,6,6-tetramethylpiperidine; 4-cyclohexyloxy-2,2,6,6-tetra methylpiperidine; 4-benzyloxy-2,2,6,6-tetramethylpiperidine; 4-phenoxy-2,2,6,6-tetramethylpiperidine; 4-(ethylcarbamoyloxy)-2,2,6,6-tetramethylpiperidine; 4-(cyclohexylcarbamoyloxy)-2,2,6,6-tetramethylpiperidine; 4-(phenylcarbamoyloxy)-2,2,6,6-tetramethylpiperidine; bis(2,2,6,6-tetramethyl-4-piperidyl)-carbonate; bis(2,2,6,6-tetramethyl-4-piperidyl)-oxalate; bis(2,2,6,6-tetramethyl-4-piperidyl)-malonate; bis(2,2,6,6-tetramethyl-4-piperidyl)-sebacate; bis(2,2,6,6-tetramethyl-4-piperidyl)-adipate; bis(2,2,6,6-tetramethyl-4-piperidyl)terephthalate; 1,2-bis(2,2,6,6-tetramethyl-4-piperidyloxy)-ethane; α,α'-bis(2,2,6,6-tetramethyl-4-piperidyloxy)-p-xylene; bis(2,2,6,6-tetramethyl-4-piperidyl)-tolylene-2,4-dicarbamate; bis(2,2,6,6-tetra methyl-4-piperidyl)-hexamethylene-1,6-dicarbamate; tris(2,2,6,6-tetramethyl-4-piperidyl)-benzene-1,3,5-tricarboxylate; tris(2,2,6,6-tetramethyl-4-piperidyl)-benzene-1,3,4-tricarboxylate; 1-[2-{3-(3,5-di-tert-butyl-4-hydroxyphenyl)propionyloxy}butyl]-4-[3-(3,5-di-tert-butyl-4-hydroxyphenyl)propionyloxy]2,2,6,6-tetramethylpiperidine; N,N'-Bis(2,2,6,6-tetramethyl-4-piperidinyl)-1,3-benzenedicarboxamide; and a condensation product of 1,2,3,4-butanetetracarboxylic acid; 1,2,2,6,6-pentamethyl-4-piperidinol; and β,β,β',β'-tetramethyl-3,9-[2,4,8,10-tetraoxaspiro(5,5)undecane]diethanol. An example of a commercial HALS is S-EED from Nylostab.

Examples of triazine-based stabilizers include 2,4,6-tris(2'-hydroxy-4'-octyloxy-phenyl)-1,3,5-triazine; 2-(2'-hydroxy-4'-hexyloxy-phenyl)-4,6-diphenyl-1,3,5-triazine; 2-(2'-hydroxy-4'-octyloxyphenyl)-4,6-bis(2',4-dimethylphenyl)-1,3,5-triazine; 2-(2',4'-dihydroxyphenyl)-4,6-bis(2',4'-dimethylphenyl)-1,3,5-triazine; 2,4-bis(2'-hydroxy-4'-propyloxy-phenyl)-6-(2',4'-dimethylphenyl)-1,3,5-triazine; 2-(2-hydroxy-4-octyloxyphenyl)-4,6-bis(4'-methylphenyl)-1,3,5-triazine; 2-(2'-hydroxy-4'-dodecyloxyphenyl)-4,6-bis(2',4'-dimethylphenyl)-1,3,5-triazine; 2,4,6-tris(2'-hydroxy-4'-isopropyloxyphenyl)-1,3,5-triazine; 2,4,6-tris(2'-hydroxy-4'-n-hexyloxyphenyl)-1,3,5-triazine; and 2,4,6-tris(2'-hydroxy-4'-ethoxycarbonylmethoxyphenyl)-1,3,5-triazine.

Impact Modifier

The polyamide compositions disclosed herein include one or more impact modifiers. The impact modifier can be an elastomeric or rubbery material selected to have good interaction and compatibility with, and dispersion among, the one or more polyamide polymers of the composition. The impact modifier can include a styrenic copolymer such as an acrylate-butadiene-styrene or a methyl methacrylate-butadiene-styrene. The impact modifier can include an acrylic polymer or a polyethylene polymer such as a chlorinated polyethylene. In some embodiments, the impact modifier includes an ethylene-octene copolymer.

The concentration of the impact modifier in the polyamide composition can, for example, range from 3 wt % to 30 wt %, e.g., from 3 wt % to 19.2 wt %, from 5.7 wt % to 21.9 wt %, from 8.4 wt % to 24.6 wt %, from 11.1 wt % to 27.3 wt %, or from 13.8 wt % to 30 wt %. In some embodiments, the concentration of the impact modifier ranges from 6 wt % to 20 wt %, e.g., from 6 wt % to 14.4 wt %, from 7.4 wt % to 15.8 wt %, from 8.8 wt % to 17.2 wt %, from 10.2 wt % to 18.6 wt %, or from 11.6 wt % to 20 wt %. In terms of upper limits, the impact modifier concentration can be less than 30 wt %, e.g., less than 27.3 wt %, less than 24.6 wt %, less than 21.9 wt %, less than 20 wt %, less than 18.6 wt %, less than 17.2 wt %, less than 15.8 wt %, less than 14.4 wt %, less than 13 wt %, less than 11.6 wt %, less than 10.2 wt %, less than 8.8 wt %, less than 7.4 wt %, less than 6 wt %, or less than 5.4 wt %. In terms of lower limits, the impact modifier concentration can be greater than 3 wt %, greater than 5.4 wt %, greater than 6 wt %, greater than 7.4 wt %, greater than 8.8 wt %, greater than 10.2 wt %, greater than 11.6 wt %, greater than 13 wt %, greater than 14.4 wt %, greater than 15.8 wt %, greater than 17.2 wt %, greater than 18.6 wt %, greater than 20 wt %, greater than 21.9 wt %, greater than 24.6 wt %, or greater than 27.6 wt %. Lower concentrations, e.g., less than 3 wt %, and higher concentrations, e.g., greater than 30 wt %, are also contemplated.

The ratio of the amounts of the impact modifier and the glass fiber in the composition have unexpectedly been found to be particularly important in producing materials having advantageous combinations of strength and ductility properties. The weight ratio of glass fiber to the impact modifier in the polyamide composition can, for example range from 0.3 to 20, e.g., from 0.3 to 3.7, from 0.46 to 5.7, from 0.69 to 8.6, from 1.1 to 13, or from 1.6 to 20. In terms of upper limits, the weight ratio of glass fiber to the impact modifier can be less than 20, e.g., less than 13, less than 8.6, less than 5.7, less than 3.7, less than 2.4, less than 1.6, less than 1.1, or less than 0.69. In terms of lower limits, the weight ratio of glass fiber to the impact modifier can be greater than 0.3, e.g., greater than 0.46, greater than 0.69, greater than 1.1, greater than 1.6, greater than 2.4, greater than 5.7, greater than 8.6, or greater than 13. Lower ratios, e.g., less than 0.3, and higher ratios, e.g., greater than 20, are also contemplated.

The weight ratio of the one or more polyamide polymers to the impact modifier in the polyamide composition can, for example, range from 0.2 to 30, e.g., from 0.2 to 4, from 0.33 to 6.7, from 0.54 to 11, from 0.9 to 18, or from 1.5 to 30. In terms of upper limits, the weight ratio of the one or more polyamide polymers to the impact modifier can be less than 30, e.g., less than 18, less than 11, less than 6.7, less than 4, less than 2.4, less than 1.5, less than 0.9, less than 0.54, or less than 0.33. In terms of lower limits, the weight ratio of the one or more polyamide polymers to the impact modifier can be greater than 0.2, e.g., greater than 0.33, greater than 0.55, greater than 0.9, greater than 1.5, greater than 2.4, greater than 6.7, greater than 11, or greater than 18. Lower ratios, e.g., less than 0.2, and higher ratios, e.g., greater than 30, are also contemplated.

Color Package (Nigrosine/Carbon Black)

The polyamide composition can include one or more soluble dyes such as nigrosine or solvent black 7. The concentration of the soluble dye, e.g., nigrosine, in the polyamide composition can, for example, range from 0.05 wt % to 10 wt %, e.g., from 0.05 wt % to 5 wt %, from 0.07 wt % to 5 wt %, from 0.1 wt % to 5 wt %, from 0.1 wt % to 3 wt %, from 0.3 wt % to 3 wt %, from 0.5 wt % to 2 wt %, from 0.5 wt % to 1.5 wt %, or from 0.7 wt % to 1.3 wt %. In terms of upper limits, the soluble dye concentration can be less than 10 wt %, e.g., less than 5 wt %, less than 3 wt %, less than 2 wt %, less than 1.5 wt %, or less than 1.3 wt %. In terms of lower limits, the soluble dye concentration can be greater than 0.05 wt %, e.g., greater than 0.07 wt %, greater than 0.1 wt %, greater than 0.3 wt %, greater than 0.5 wt %, or greater than 0.7 wt %. Lower concentrations, e.g., less than 0.05 wt %, and higher concentrations, e.g., greater than 10.0 wt %, are also contemplated.

It has been discovered that the weight ratio of polyamide polymer to soluble dye has been shown to be critical to product performance.

In some embodiments, the weight ratio of polyamide polymer to soluble dye ranges from 1 to 100, e.g., from 5 to 90, from 5 to 85, from 10 to 80, from 20 to 70, from 30 to 70, from 40 to 70, from 45 to 65, or from 47 to 64. In terms of upper limits, the weight ratio of polyamide polymer to soluble dye may be less than 100, e.g., less than 90, less than 85, less than 80, less than 70, less than 65, or less than 64. In terms of lower limits, the weight ratio of polyamide polymer to soluble dye may be greater than 1, e.g., greater than 5, greater than 10, greater than 20, greater than 30, greater than 40, greater than 45, or greater than 47.

The polyamide composition can include one or more pigments such as carbon black, preferably in small amount, if any. The concentration of the carbon black in the polyamide composition can, for example, range from 0.1 to 5 wt %, e.g., from 0.1 wt % to 1.05 wt %, from 0.15 wt % to 1.55 wt %, from 0.22 wt % to 2.29 wt %, from 0.32 wt % to 3.38 wt %, or from 0.48 wt % to 5 wt %. In some embodiments, the concentration of the carbon black ranges from 0.2 wt % to 0.8 wt %. In terms of upper limits, the carbon black concentration can be less than 5.0 wt %, e.g., less than 4.0 wt %, less than 3.0. wt %. less than 2.0 wt %, less than 1.5 wt %, less than 1.0 wt %, or less than 0.5 wt %. In some embodiments, the concentration of the carbon black is less than 3 wt %. In terms of lower limits, the carbon black concentration can be greater than 0.1 wt %, e.g., greater than 0.15 wt %, greater than 0.22 wt %, greater than 0.32 wt %, greater than 0.48 wt %, greater than 0.71 wt %, greater than 1 wt %, greater than 1.5 wt %, greater than 2.3 wt %, or greater than 3.4 wt %. Lower concentrations, e.g., less than 0.1 wt %, and higher concentrations, e.g., greater than 5 wt %, are also contemplated.

Lubricant

The polyamide composition can include one or more lubricants. The type and relative amount of lubricant can be selected to improve processing of the composition and to contribute to the simultaneously high strength and ductility of the material, and may vary widely.

In some embodiments, the lubricant includes a fatty acid, e.g., a fatty acid wax. In some embodiments, the wax includes a saturated fatty acid. In some embodiments, the lubricant includes stearic acid, behenic acid, or salts or combinations thereof. In some embodiments, the lubricant consists of stearic acid, behenic acid, or salts or combinations thereof. The stearate lubricant can include, for example, zinc stearate calcium stearate, aluminum distearate, zinc stearate, calcium stearate, N,N' ethylene bis-stearamide, stearyl erucamide. In some embodiments, the lubricant does not include an ionic lubricant. In one embodiment, the polyamide composition comprises N,N' ethylene bis-stearamide. In some cases, the polyamide composition comprises zinc stearate, or stearic acid, or combinations thereof.

In some embodiments, the polyamide comprises little or no calcium-based compounds. The inventors have found that calcium-based compounds can be beneficially reduced or eliminated by employing the aforementioned heat stabilizer packages. Calcium-based stabilizers are generally more expensive and more difficult to process; the present compositions allow the use of other lubricants, e.g., stearic acid or zinc stearate, without a drop in performance. For example, the polyamide composition may comprise less than 0.5 wt % calcium-based compounds, e.g., less than 0.4 wt %, less than 0.3 wt %, less than 0.2 wt %, or less than 0.1 wt %.

In some embodiments, the concentration of the lubricant in the polyamide composition ranges from 0.01 to 10 wt %, e.g., from 0.01 wt % to 5.0 wt %, from 0.05 wt % to 5.0 wt %, from 0.05 wt % to 2.0 wt %, 0.05 wt % to 1.5 wt %, 0.07 wt % to 1.1 wt %, 0.07 wt % to 0.5 wt %, or from 0.07 wt % to 0.15 wt %. In terms of upper limits, the lubricant concentration can be less than 10.0 wt %, e.g., less than 7.0 wt %, less than 5.0 wt %. less than 3.0 wt %, less than 2.0 wt %, less than 1.5 wt %, less than 1.0 wt %, less than 0.7 wt %, less than 0.5 wt %, less than 0.3 wt %, or less than 0.2 wt %. In terms of lower limits, the lubricant concentration can be greater than 0.01 wt %, e.g., greater than 0.02 wt %, greater than 0.03 w %, greater than 0.04 wt %, greater than 0.05 wt %, greater than 0.06 wt %, greater than 0.07 wt %, greater than 0.08 wt %, or greater than 0.09 wt %. Lower concentrations, e.g., less than 0.01 wt %, and higher concentrations, e.g., greater than 10 wt %, are also contemplated.

Suitable commercially-available lubricants include Acrawax from Lonza.

The polyamide composition may further comprise an antioxidant or antioxidant package. The inventors have found that the combination of specific antioxidants with the aforementioned polyamides and glass fibers, unexpectedly contributes to the advantageous performance characteristics.

Other Additives

The polyamide composition can also include one or more chain terminators, viscosity modifiers, plasticizers, UV stabilizers, catalysts, other polymers, flame retardants, delusterants, antimicrobial agents, antistatic agents, optical brighteners, extenders, processing aids, talc, mica, gypsum, wollastonite and other commonly used additives known to those of skill in the art. Additional suitable additives may be found in Plastics Additives, An A-Z reference, Edited by Geoffrey Pritchard (1998). The optional addition of a stabilizer to the additive dispersion is present in an exemplary embodiment. Stabilizers suitable for the additive dispersion include, but are not limited to, polyethoxylates (such as the polyethoxylated alkyl phenol Triton X-100), polypropoxylates, block copolymeric polyethers, long chain alcohols, polyalcohols, alkyl sulfates, alkyl-sulfonates, alkyl-benzenesulfonates, alkylphosphates, alkyl-phosphonates, alkyl-naphthalene sulfonates, carboxylic acids and perfluoronates.

In some embodiments, the stain resistance of the polyamide composition can be improved by salt-blending the polyamide precursor with a cationic dye modifier, such as 5-sulfoisophthalic acid or salts or other derivatives thereof.

Chain extenders can also be included in the polyamide composition. Suitable chain extender compounds include bis-N-acyl bislactam compounds, isophthaloyl bis-caprolactam (IBC), adipoyl bis-caprolactam (ABC), terphthaloyl bis-caprolactam (TBS), and mixtures thereof.

The polyamide composition can also include anti-block agents. Inorganic solids, usually in the form of diatomaceous earth, represent one class of materials that can be added to the disclosed polyamide composition. Non-limiting examples include calcium carbonate, silicon dioxide, magnesium silicate, sodium silicate, aluminum silicate, aluminum potassium silicate, and silicon dioxide are examples of suitable antiblock agents.

The disclosed polyamide compositions can also include a nucleating agent, optionally in small amounts, to further improve clarity and oxygen barrier as well as enhance oxygen barrier. Typically, these agents are insoluble, high melting point species that provide a surface for crystallite initiation. By incorporating a nucleating agent, more crystals are initiated, which are smaller in nature. More crystallites or higher % crystallinity correlates to more reinforcement/higher tensile strength and a more tortuous path for oxygen flux (increased barrier); smaller crystallites decreases light scattering which correlates to improved clarity. Non-limiting examples include calcium fluoride, calcium carbonate, talc and Nylon 2,2.

Beneficially, the polyamide compositions demonstrate suitable clarity and/or oxygen barrier properties, while not requiring greater amounts of nucleating agent. In some embodiments, the polyamide composition of any of the preceding claims, wherein the polyamide composition comprises less than 2.2 wt % nucleation agent, e.g., less than 2.0 wt %, less than 1.8 wt %, less than 1.5 wt %, less than 1.2 wt %, less than 1.0 wt %, less than 0.8 wt %, less than 0.5 wt %, less than 0.3 wt %, or less than 0.1 wt %.

The polyamide compositions can also include organic anti-oxidants in the form of hindered phenols such as, but not limited to, Irganox 1010, Irganox 1076 and Irganox 1098; organic phosphites such as, but not limited to, Irgafos 168 and Ultranox 626; aromatic amines, metal salts from Groups IB, IIB, III, and IV of the periodic table and metal halides of alkali and alkaline earth metals.

Mechanical Performance Properties

Generally, tensile strength measurements may be conducted under ISO 527-1 (2019), Charpy notched impact energy loss of the polyamide composition may be measured using a standard protocol such as ISO 179-1 (2010). Hydrolysis aging may be conducted by submerging panels in a mixture of ethylene glycol and deionized water, e.g., 50/50 by volume, and heating to 130° C. for a desired time, e.g., 500 hours or 1000 hours.

Impact Resilience

In some embodiments, the polyamide composition (or articles made therefrom) when hydrolysis aged for 500 hours at 130° C., demonstrates an impact resilience greater than 35 kJ/m$^2$, as measured at 23° C., e.g., greater than 37 kJ/m$^2$, greater than 39 kJ/m$^2$, greater than 40 kJ/m$^2$, greater than 42 kJ/m$^2$, greater than 46 kJ/m$^2$, greater than 48 kJ/m$^2$, or greater than 50 kJ/m$^2$.

In some embodiments, the polyamide composition (or articles made therefrom) when hydrolysis aged for 1000 hours at 130° C., the polyamide composition demonstrates an impact resilience greater than 16 kJ/m$^2$, as measured at 23° C. greater than 18 kJ/m$^2$, greater than 19 kJ/m$^2$, greater than 19.75 kJ/m$^2$, greater than 21 kJ/m$^2$, or greater than 23 kJ/m$^2$.

In some embodiments, the polyamide composition (or articles made therefrom) when hydrolysis aged for 500 hours at 130° C., the polyamide composition demonstrates an impact resilience retention greater than 49%, as measured at 23° C., e.g., greater than 53%, greater than 57%, greater than 57.5%, greater than 58%, or greater than 60%.

In some embodiments, the polyamide composition (or articles made therefrom) when hydrolysis aged for 1000 hours at 130° C., the polyamide composition demonstrates an impact resilience retention greater than 22%, as measured at 23° C., e.g., greater than 24%, greater than 25%, greater than 25.5%, greater than 26.5%, greater than 26%, or greater than 28%.

Tensile Elongation

In some embodiments, the polyamide composition (or articles made therefrom) when hydrolysis aged for 500 hours at 130° C., the composition demonstrates a tensile elongation greater than 1.8%, e.g., greater than 2.03%, greater than 2.2%, greater than 2.35%, greater than 2.4%, greater than 2.7%, greater than 2.8%, or greater than 2.85%.

In some embodiments, the polyamide composition (or articles made therefrom) when hydrolysis aged for 1000 hours at 130° C., the composition demonstrates a tensile elongation greater than 0.6%, e.g., greater than 0.65%, greater than 0.66%, greater than 0.7%, greater than 0.8%, greater than 0.9%, or greater than 1.0%.

In some embodiments, the polyamide composition (or articles made therefrom) when hydrolysis aged for 500 hours at 130° C., the composition demonstrates a tensile elongation retention greater than 57%, e.g., greater than 63%, greater than 70%, greater than 72%, greater than 74%, greater than 80%, or greater than 85%.

In some embodiments, the polyamide composition (or articles made therefrom) when hydrolysis aged for 1000 hours at 130° C., the composition demonstrates a tensile elongation retention greater than 20%, e.g., greater than 20.5%, greater than 23%, greater than 25%, greater than 30%, or greater than 31%.

Tensile Modulus

In some embodiments, the polyamide composition (or articles made therefrom) when hydrolysis aged for 500 hours at 130° C., the composition demonstrates a tensile modulus greater than 4500 MPa, e.g., greater than 4525 MPa, greater than 4570 MPa, greater than 4600 MPa, or greater than 4700 MPa.

In some embodiments, the polyamide composition (or articles made therefrom) when hydrolysis aged for 1000 hours at 130° C., the composition demonstrates a tensile modulus greater than 4195 MPa, e.g., greater than 4235 MPa, greater than 4300 MPa, greater than 4345 MPa, or greater than 4400 MPa.

In some embodiments, the polyamide composition (or articles made therefrom) when hydrolysis aged for 500 hours at 130° C., the composition demonstrates a tensile modulus retention greater than 40%, e.g., greater than 42%, greater than 43%, or greater than 45%.

In some embodiments, the polyamide composition (or articles made therefrom) when hydrolysis aged for 1000 hours at 130° C., the composition demonstrates a tensile modulus retention greater than 38%, e.g., greater than 41%, greater than 41.5%, greater than 42%, or greater than 43%.

Tensile Strength

In some embodiments, the polyamide composition (or articles made therefrom) when hydrolysis aged for 500 hours at 130° C., the composition demonstrates a tensile strength greater than 59 MPa, e.g., greater than 64 MPa, greater than 68 MPa, greater than 69 MPa, greater than 72 MPa, or greater than 75 MPa.

In some embodiments, the polyamide composition (or articles made therefrom) when hydrolysis aged for 1000 hours at 130° C., the composition demonstrates a tensile strength greater than 24 MPa, e.g., greater than 24.5 MPa, greater than 25.5 MPa, greater than 30 MPa, greater than 32 MPa, or greater than 35 MPa.

In some embodiments, the polyamide composition (or articles made therefrom) when hydrolysis aged for 500 hours at 130° C., the composition demonstrates a tensile strength retention greater than 29%, e.g., greater than 32%, greater than 32.5%, greater than 35%, greater than 37%, or greater than 36%.

In some embodiments, the polyamide composition (or articles made therefrom) when hydrolysis aged for 1000 hours at 130° C., the composition demonstrates a tensile strength retention greater than 11%, e.g., greater than 12%, greater than 12.5%, greater than 13%, greater than 15%, or greater than 18%.

In some embodiments, the polyamide composition demonstrates a tensile strength of at least 75 MPa, e.g., at least 80 MPa, at least 90 MPa, at least 100 MPa, or at least 110 MPa, when heat aged for 3000 hours at a temperature of at least 180° C. and measured at 23° C. In terms of ranges, the tensile strength may range from 75 MPa to 175 MPa, e.g., from 80 MPa to 160 MPa, from 85 MPa to 160 MPa, or from 90 MPa to 160 MPa. Generally, tensile strength measurements may be conducted under ISO 527-1 (2018), and heat aging measurements may be conducted under ISO 180 (2018).

AS noted above, it has been found that the heat-stabilized polyamide compositions also show improved resilience to other forms of damage. That is to say, the polyamide compositions exhibit other desirable mechanical properties after having been exposed to high temperatures. One such property is impact resilience. Impact resilience is a metric that relates to the durability of the polyamide composition. Some embodiments of the heat-stabilized polyamide composition exhibit an impact resilience of greater than 25 $kJ/m^2$, e.g., greater than 30 $kJ/m^2$, greater than 35 $kJ/m^2$, greater than 40 $kJ/m^2$, greater than 45 $kJ/m^2$, greater than 50 $kJ/m^2$, greater than 70 $kJ/m^2$, greater than 80 $kJ/m^2$, or greater than 100 $kJ/m^2$, when measured by ISO 179 (2018). In terms of ranges, the heat-stabilized polyamide composition exhibit an impact resilience ranging from 25 $kJ/m^2$ to 500 $kJ/m^2$, from 30 $kJ/m^2$ to 250 $kJ/m^2$, from 35 $kJ/m^2$ to 150 $kJ/m^2$, from 35 $kJ/m^2$ to 100 $kJ/m^2$, from 25 $kJ/m^2$ to 75 $kJ/m^2$, or from 35 $kJ/m^2$ to 750 $kJ/m^2$.

In one embodiment, the polyamide composition comprises from 61 wt % to 73 wt % polyamide polymer and from 25 wt % to 35 wt % glass fibers. The polyamide polymer may have a theoretical amine end group content ranging from 62 µeq/gram to 85 µeq/gram and a relative viscosity ranging from 36 to 55. The weight ratio of polyamide polymer to glass fibers may range from 1.5:1 to 2.8:1. When hydrolysis aged for 1000 hours at 130° C., the polyamide composition demonstrates an impact resilience greater than 19.75 $kJ/m^2$, as measured at 23° C.

In one embodiment, the polyamide composition comprises from 61 wt % to 73 wt % polyamide polymer wherein the polyamide polymer comprises from 27 wt % to 72 wt % of a first polyamide having a theoretical amine end group content ranging from 75 µeq/gram to 90 µeq/gram and from 0 wt % to 50 wt % of a second polyamide having a theoretical amine end group content ranging from 20 µeq/gram to 49 µeq/gram; and from 25 wt % to 35 wt % glass fibers. The composition may further comprise from 1 ppb to 0.24 wt % iodide compound and less than 0.01 wt % copper. The polyamide polymer may have an overall theoretical amine end group content ranging from 60 µeq/gram to 85 µeq/gram. The polyamide polymer may have a relative viscosity ranging from 36 to 55. When hydrolysis aged for 1000 hours at 130° C., the polyamide composition demonstrates an impact resilience greater than 19.75 $kJ/m^2$, as measured at 23° C.; and wherein, when hydrolysis aged for 500 hours at 130° C., the composition demonstrates a tensile elongation greater than 2.35%.

Methods of Preparation

The present disclosure also relates to processes of producing the provided hydrolysis resistant polyamide compositions. The methods include providing one or more polyamide polymers, glass fiber, and other optional components. The methods can further include selecting the type and relative amounts of the one or more polyamide polymers, glass fiber, and other optional components to provide desired properties to the resulting polyamide composition. In some embodiments, the methods further include selecting, providing, and/or combining one or more dyes such as nigrosine, one or more pigments such as carbon black, and/or one or more lubricants.

In one embodiment, the disclosure relates to preparing a polyamide composition, the method comprises the step of combining the aforementioned components to produce the polyamide composition.

The components of the polyamide composition can be mixed and blended together to produce the polyamide composition, or can be formed in situ using appropriate reactants. The terms "adding" or "combining" without further clarification are intended to encompass either the addition of the material itself to the composition or the in situ formation of the material in the composition. In another embodiment, two or more materials to be combined with the composition are simultaneously added via masterbatch.

Molded Articles

The present disclosure also relates to (molded) articles that include any of the provided hydrolysis resistant compositions. The article can be produced, for example, via conventional injection molding, extrusion molding, blow molding, press molding, compression molding, or gas assist molding techniques. Molding processes suitable for use with the disclosed compositions and articles are described in U.S. Pat. Nos. 8,658,757; 4,707,513; 7,858,172; and 8,192,664, each of which is incorporated herein by reference in its entirety for all purposes. Examples of articles that can be made with the provided polyamide compositions include those used in electrical and electronic applications (such as, but not limited to, circuit breakers, terminal blocks, connectors and the like), automotive applications (such as, but not limited to, air handling systems, radiator end tanks, fans, shrouds, and the like), furniture and appliance parts, and wire positioning devices such as cable ties. In some embodiments, the articles include automotive/vehicle parts, especially engine parts, such as radiator end tanks/tubing and oil filter modules.

Examples

Examples 1-5 and Comparative Examples A and B were prepared by combining components as shown in Table 1 and compounding in a twin screw extruder. Polymers were melted, additives were added to the melt, and the resultant mixture was extruded and pelletized. Percentages are expressed as weight percentages. Examples 1-5 and Comparative Examples A and B employed PA-6,6 polyamides having amine end groups shown in Table 1.

The stabilizer package comprised copper compound (in low amounts, where present at all), amine stabilizer, e.g., Naugard 44, and/or phosphite stabilizer, e.g., Alkanox 240, and/or hindered amine light stabilizer, e.g., Nylostab S-EED, in the amounts shown in Table 1.

TABLE 1

Example and Comparative Example Compositions

| Component | Ex. 1 | Ex. 2 | Ex. 3 | Ex. 4 | Ex. 5 | Comp. Ex. 3 | Comp. Ex. 4 |
|---|---|---|---|---|---|---|---|
| PA-66 78-85 µeq/gram AEG | 66.79% | 33.39% | 33.97% | 50.96% | 67.95% | 0.00% | 16.99% |
| PA-66 44-49 µeq/gram AEG | 0.00% | 33.40% | 33.98% | 16.99% | 0.00% | 67.95% | 50.96% |
| Th. AEG Concentration, % | 82 | 62 | 62 | 72 | 82 | 42 | 52 |
| Glass Fiber | 30.30% | 30.30% | 30.00% | 30.00% | 30.00% | 30.00% | 30.00% |
| PA: Glass Ratio | 2.2 | 2.2 | 2.3 | 2.3 | 2.3 | 2.3 | 2.3 |
| Nigrosine (masterbatch) | 1.5% | 1.5% | 1.5% | 1.5% | 1.5% | 1.5% | 1.5% |
| Carbon Black (masterbatch) | 0.15% | 0.15% | 0.15% | 0.15% | 0.15% | 0.15% | 0.15% |
| Heat Stabilizer | 0.60% | 0.60% | 0.40% (master batch) | 0.40% (master batch) | 0.40% (master batch) | 0.40% (master batch) | 0.40% (master batch) |
| Copper metal content | 0 | 0 | <0.01% | <0.01% | <0.01% | <0.01% | <0.01% |
| Non-copper metal halide content | | | 0.23% | 0.23% | 0.23% | 0.23% | 0.23% |
| Wax | 0.10% | 0.10% | — | — | — | — | — |
| Stearic Acid | 0.56% | 0.56% | — | — | — | — | — |

Panels were formed from the pellets, and the panels were tested under hydrolysis aging for 500 hours and 1000 hours at 130° C. The panels were tested for tensile strength, tensile strength retention, tensile elongation, tensile elongation retention, tensile modulus, tensile modulus retention, and impact resilience (un-notched Charpy at 23 C) and impact resilience retention. The results for the 500 hour and 1000 hour hydrolysis aging are shown in Tables 2a and 2b.

TABLE 2a

Test Results (500 hours)

| | Ex. 1 | Ex. 2 | Ex. 3 | Ex. 4 | Ex. 5 | Comp. Ex. A | Comp. Ex. B |
|---|---|---|---|---|---|---|---|
| Ten. Str, MPa | 78.45 | 68.77 | 69.74 | 73.13 | 73.05 | 59.41 | 64.25 |
| TSR, % | 41% | 36% | 36% | 38% | 38% | 30% | 33% |
| Ten. El, MPa | 3.25 | 2.37 | 2.42 | 2.79 | 2.90 | 1.84 | 2.03 |
| TER, % | 100% | 73% | 75% | 82% | 86% | 57% | 63% |
| Ten. Mod, $_{MPa}$ | 4628.6 | 4574 | 4781.4 | 4585.6 | 4527 | 4680.8 | 4726 |
| TMR, % | 46% | 45% | 47% | 45% | 45% | 46% | 47% |
| IR, kJ/m$^2$ | 50.13 | 42.08 | 42.91 | 46.27 | 46.42 | 37.26 | 39.30 |
| IRR, % | 68% | 55% | 58% | 57% | 59% | 49% | 53% |

TABLE 2b

Test Results (1000 hours)

| | Ex. 1 | Ex. 2 | Ex. 3 | Ex. 4 | Ex. 5 | Comp. Ex. A | Comp. Ex. B |
|---|---|---|---|---|---|---|---|
| Ten. Str, MPa | 36.44 | 23.46 | 25.91 | 26.56 | 37.84 | 26.72 | 25.00 |
| TSR, % | 19% | 12% | 13% | 14% | 20% | 14% | 13% |
| Ten. El, MPa | 1.04 | 0.67 | 0.70 | 0.71 | 1.15 | 0.75 | 0.66 |
| TER, % | 32% | 21% | 22% | 21% | 34% | 23% | 20% |
| Ten. Mod, $_{MPa}$ | 4463.4 | 4285.6 | 4348.6 | 4412.2 | 4216 | 4235 | 4192.4 |
| TMR, % | 44% | 42% | 43% | 43% | 42% | 41% | 42% |
| IR, kJ/m$^2$ | 21.75 | 19.80 | 19.93 | 21.47 | 23.33 | 18.38 | 16.58 |
| IRR, % | 30% | 26% | 27% | 26% | 30% | 24% | 22% |

As shown in Tables 2a and 2b, the disclosed compositions demonstrated synergistic combinations of mechanical properties. For example, the compositions demonstrated a synergistic combination of tensile elongation and impact resilience.

As shown, hydrolysis age performance (at 500 and 1000 hours) was surprisingly improved. In particular, tensile elongation was unexpectedly improved. For example, at 500 hour hydrolysis age, tensile elongation at 130° C. ranged from 2.37 MPa to 3.25 MPa for Exs. 1-5, but only 1.84 and 2.03 MPa for Comp. Exs. A and B. Also tensile elongation retention at 500 hour hydrolysis age ranged from 73% to 100% for Exs. 1-5, but only 57% and 63% for Comp. Exs. A and B. Both are significant improvements.

At 1000 hours, tensile elongation ranged from 0.67 MPa to 1.15 MPa for Exs. 1-5, but only 0.75 and 0.66 MPa for Comp. Exs. A and B. Also tensile elongation retention at 1000 hour hydrolysis age ranged from 21% to 34% for Exs. 1-5, but only 23% and 20% for Comp. Exs. A and B. Both are significant improvements.

Also, the combinations demonstrated unexpected improvements in impact resilience. Typically, polymer compositions that demonstrate good tensile performance have less than desirable impact resilience performance and vice versa. For example, at 500 hour hydrolysis age, impact resilience ranged from 42.08 kJ/m$^2$ to 50.13 kJ/m$^2$ or Exs. 1-5, but only 37.26 and 39.30 for Comp. Exs. A and B. Also impact resilience retention at 500 hour hydrolysis age ranged from 55% to 68% for Exs. 1-5, but only 49% and 53% for Comp. Exs. A and B. Both are significant improvements.

Superior results were shown at 1000 hour aging as well. For example, impact resilience ranged from 19.88 kJ/m$^2$ to 23.33 kJ/m$^2$ or Exs. 1-5, but only 18.38 kJ/m$^2$ and 16.58 kJ/m$^2$ for Comp. Exs. A and B. Also impact resilience retention at 1000 hour hydrolysis age ranged from 26% to 30% for Exs. 1-5, but only 22% and 24% for Comp. Exs. A and B. Both are significant improvements.

EMBODIMENTS

The following embodiments are contemplated. All combinations of features and embodiments are contemplated.

Embodiment 1

A hydrolysis resistant polyamide composition comprising from 5 wt % to 85 wt % polyamide polymer comprising at least 35 µeq/gram amine end groups; from 25 wt % to 60 wt % glass fibers; and less than 5 wt % of an antioxidant; wherein the polyamide composition retains a tensile strength of at least 75 MPa, when heat aged for 3000 hours at a temperature of at least 180° C. and measured at 23° C.

Embodiment 2

An embodiment of embodiment 1, wherein the weight ratio polyamide polymer to glass fibers is at least 0.5:1, preferably ranging from 0.5:1 to 2:1.

Embodiment 3

An embodiment of any of embodiments 1 and 2, wherein the relative viscosity of the polyamide polymer is at least 5, as measured by the formic acid method.

Embodiment 4

An embodiment of any of embodiments 1-3, wherein the polyamide polymer comprises from 50 µeq/gram to 100 µeq/gram amine end groups.

Embodiment 5

An embodiment of any of embodiments 1-4, wherein the polyamide composition comprises less than 2.2 wt % nucleation agent.

Embodiment 6

An embodiment of any of embodiments 1-5, wherein the polyamide composition comprises less than 5.0 wt % heat stabilizers and/or scavengers.

Embodiment 7

An embodiment of any of embodiments 1-6, wherein the polyamide composition comprises less than 3.0 wt % copper-based heat stabilizers.

Embodiment 8

An embodiment of any of embodiments 1-7, wherein the polyamide composition comprises less than 45 wt % lamellar mineral reinforcing materials or fillers, in particular, mica.

Embodiment 9

An embodiment of any of embodiments 1-8, comprising: from 50 wt % to 80 wt % polyamide polymer; and from 20 wt % to 50 wt % glass fibers.

Embodiment 10

An embodiment of any of embodiments 1-9, comprising: from 35 wt % to 65 wt % polyamide polymer; and from 35 wt % to 65 wt % glass fibers.

Embodiment 11

An embodiment of any of embodiments 1-10, wherein the polyamide polymer comprises a PA-6,6 polymer.

Embodiment 12

An embodiment of any of embodiments 1-11, wherein the number average molecular weight of the polyamide polymer is less than 100,000.

Embodiment 13

An embodiment of any of embodiments 1-12, wherein the polyamide composition comprises: from 55 wt % to 72 wt % polyamide polymer; and from 20 wt % to 50 wt % glass fibers; wherein the polyamide polymer comprises from 70 µeq/gram to 80 µeq/gram amine end groups; and wherein the polyamide polymer has a relative viscosity ranging from 36 to 55.

Embodiment 14

An embodiment of any of embodiments 1-13, wherein the polyamide composition comprises: from 45 wt % to 55 wt % polyamide polymer; and from 45 wt % to 55 wt % glass fibers; wherein the polyamide polymer comprises from 70 µeq/gram to 80 µeq/gram amine end groups; and wherein the polyamide polymer has a relative viscosity ranging from 36 to 55.

Embodiment 15

An embodiment of any of embodiments 1-14, wherein the polyamide composition comprises: from 60 wt % to 70 wt % polyamide polymer; from 30 wt % to 40 wt % glass fibers; from 0.05 wt % to 2 wt % amine antioxidant; and from 0.5 wt % to 2 wt % phenol antioxidant; and wherein the polyamide polymer comprises from 74 µeq/gram to 80 µeq/gram amine end groups; and wherein the polyamide polymer has a relative viscosity ranging from 40 to 50.

Embodiment 16

An embodiment of any of embodiments 1-15, wherein the polyamide composition comprises: from 45 wt % to 51 wt % polyamide polymer; from 46 wt % to 53 wt % glass fibers; from 0.05 wt % to 2 wt % amine antioxidant; and from 0.5 wt % to 2 wt % phenol antioxidant; and wherein the polyamide polymer comprises from 74 µeq/gram to 80 µeq/gram amine end groups; and wherein the polyamide polymer has a relative viscosity ranging from 40 to 50.

Embodiment 17

An embodiment of any of embodiments 1-16, wherein the polyamide polymer is crystalline or semi-crystalline.

Embodiment 18

An embodiment of any of embodiments 1-17, wherein the weight ratio of the polyamide polymer to the nigrosine ranges from 1 to 85.

Embodiment 19

An embodiment of any of embodiments 1-18, comprising a saturated fatty acid lubricant.

Embodiment 20

An injection molded article comprising the polyamide composition of any of the preceding claims.

Embodiment 21

A hydrolysis composition comprising from 50 wt % to 80 wt % polyamide polymer having a theoretical amine end group content of at least 55 µeq/gram; and from 25 wt % to 60 wt % glass fibers; wherein the weight ratio of polyamide polymer to glass fibers ranges from 0.5:1 to 4.0:1; wherein the polyamide composition comprises: less than 0.06 wt % copper; or from 1 ppb to 0.24 wt % non-copper metal halide compound; and wherein the polyamide composition, when hydrolysis aged for 500 hours at 130° C., demonstrates an impact resilience greater than 40 kJ/m2, as measured at 23° C.

Embodiment 22

An embodiment of embodiment 21, wherein, when hydrolysis aged for 1000 hours at 130° C., the polyamide composition demonstrates an impact resilience greater than 19 kJ/m², as measured at 23° C.

Embodiment 23

An embodiment of any of embodiments 21 and 22, wherein, when hydrolysis aged for 500 hours at 130° C., the polyamide composition demonstrates an impact resilience retention greater than 53%, as measured at 23° C.

Embodiment 24

An embodiment of any of embodiments 21-23, wherein, when hydrolysis aged for 1000 hours at 130° C., the polyamide composition demonstrates an impact resilience retention greater than 24%, as measured at 23° C.

Embodiment 25

An embodiment of any of embodiments 21-24, wherein, when hydrolysis aged for 500 hours at 130° C., the composition demonstrates a tensile elongation greater than 2.03%, as measured at 23° C.

Embodiment 26

An embodiment of any of embodiments 21-25, wherein, when hydrolysis aged for 500 hours at 130° C., the composition demonstrates a tensile elongation retention greater than 63%, as measured at 23° C.

Embodiment 27

An embodiment of any of embodiments 21-26, wherein, when hydrolysis aged for 1000 hours at 130° C., the composition demonstrates a tensile elongation greater than 0.66%, as measured at 23° C.

Embodiment 28

An embodiment of any of embodiments 21-27, wherein the polyamide polymer has a theoretical amine end group content ranging from 62 µeq/gram to 82 µeq/gram.

Embodiment 29

An embodiment of any of embodiments 21-28, wherein the polyamide composition does not comprise copper or copper-based compounds.

Embodiment 30

An embodiment of any of embodiments 21-28, wherein the weight ratio polyamide polymer to glass fibers ranges from 0.7:1 to 3.0:1.

Embodiment 31

An embodiment of any of embodiments 21-30, wherein the relative viscosity of the polyamide polymer is at least 5, as measured by the formic acid method.

Embodiment 32

An embodiment of any of embodiments 21-31, wherein the polyamide composition comprises less than 0.01 wt % copper and from 1 ppb to 0.23 wt % iodide compound.

Embodiment 33

An embodiment of any of embodiments 21-32, wherein the polyamide composition further comprises zinc stearate, or stearic acid, or combinations thereof.

Embodiment 34

An embodiment of any of embodiments 21-33, wherein the polyamide composition does not comprise calcium-based compounds.

Embodiment 35

An embodiment of any of embodiments 21-34, wherein the polyamide polymer comprises: a first polyamide having a theoretical amine end group content ranging from 75 µeq/gram to 90 µeq/gram; and a second polyamide having a theoretical amine end group content ranging from 40 µeq/gram to 50 µeq/gram; wherein the theoretical amine end group content of the polyamide polymer is at least 55 µeq/gram.

Embodiment 36

An embodiment of any of embodiments 21-35, comprising from 61 wt % to 73 wt % polyamide polymer; and from 25 wt % to 35 wt % glass fibers.

Embodiment 37

An embodiment of any of embodiments 21-36, wherein the polyamide polymer comprises a PA-6,6.

Embodiment 38

An embodiment of any of embodiments 21-37, wherein the polyamide composition comprises: from 61 wt % to 73 wt % polyamide polymer; and from 25 wt % to 35 wt % glass fibers; wherein the polyamide polymer has a theoretical amine end group content ranging from 62 µeq/gram to 85 µeq/gram; and wherein the polyamide polymer has a relative viscosity ranging from 36 to 55; wherein the weight ratio of polyamide polymer to glass fibers ranges from 1.5:1 to 2.8:1; and wherein, when hydrolysis aged for 1000 hours at 130° C., the polyamide composition demonstrates an impact resilience greater than 19.75 kJ/m², as measured at 23° C.

Embodiment 39

An embodiment of any of embodiments 21-38, wherein the polyamide composition comprises: from 61 wt % to 73 wt % polyamide polymer wherein the polyamide polymer comprises from 27 wt % to 72 wt % of a first polyamide having a theoretical amine end group content ranging from 75 µeq/gram to 90 µeq/gram; and from 0 wt % to 50 wt % of a second polyamide having a theoretical amine end group content ranging from 20 µeq/gram to 49 µeq/gram; from 25 wt % to 35 wt % glass fibers; from 1 ppb to 0.24 wt % iodide compound less than 0.01 wt % copper; and wherein the polyamide polymer has a theoretical amine end group content ranging from 60 µeq/gram to 85 µeq/gram; and wherein the polyamide polymer has a relative viscosity ranging from 36 to 55; and wherein when hydrolysis aged for 1000 hours at 130° C., the polyamide composition demonstrates an impact resilience greater than 19.75 kJ/m², as measured at 23° C.; and wherein, when hydrolysis aged for 500 hours at 130° C., the composition demonstrates a tensile elongation greater than 2.35%.

Embodiment 40

A (molded) article comprising the polyamide composition of claim 1.

While the disclosure has been described in detail, modifications within the spirit and scope of the disclosure will be readily apparent to those of skill in the art. In view of the foregoing discussion, relevant knowledge in the art and references discussed above in connection with the Background and Detailed Description, the disclosures of which are all incorporated herein by reference. In addition, it should be understood that aspects of the disclosure and portions of various embodiments and various features recited below and/or in the appended claims may be combined or interchanged either in whole or in part. In the foregoing descriptions of the various embodiments, those embodiments which refer to another embodiment may be appropriately combined with other embodiments as will be appreciated by one of skill in the art. Furthermore, those of ordinary skill in the art will appreciate that the foregoing description is by way of example only, and is not intended to limit the disclosure.

We claim:

1. A hydrolysis resistant polyamide composition comprising:
   from 50 wt % to 80 wt % polyamide polymer having a theoretical amine end group content of at least 55 µeq/gram; and
   from 25 wt % to 60 wt % glass fibers; and
   wherein the weight ratio of polyamide polymer to glass fibers ranges from 0.5:1 to 4.0:1;
   wherein the polyamide composition comprises:
   from 10 ppm to 0.02 wt % of a copper-based stabilizer;
   less than 0.01 wt % copper; and
   from 1 ppb to 0.24 wt % non-copper metal halide compound; and
   wherein the polyamide composition, when hydrolysis aged for 500 hours at 130° C., demonstrates an impact resilience greater than 40 kJ/m², as measured at 23° C.

2. The polyamide composition of claim 1, wherein, when hydrolysis aged for 1000 hours at 130° C., the polyamide composition demonstrates an impact resilience greater than 19 kJ/m², as measured at 23° C.

3. The polyamide composition of claim 1, wherein, when hydrolysis aged for 500 hours at 130° C., the polyamide composition demonstrates an impact resilience retention greater than 53%, as measured at 23° C.

4. The polyamide composition of claim 1, wherein, when hydrolysis aged for 1000 hours at 130° C., the polyamide composition demonstrates an impact resilience retention greater than 24%, as measured at 23° C.

5. The polyamide composition of claim 1, wherein, when hydrolysis aged for 500 hours at 130° C., the composition demonstrates a tensile elongation greater than 2.03%, as measured at 23° C.

6. The polyamide composition of claim 1, wherein, when hydrolysis aged for 500 hours at 130° C., the composition demonstrates a tensile elongation retention greater than 63%, as measured at 23° C.

7. The polyamide composition of claim 1, wherein, when hydrolysis aged for 1000 hours at 130° C., the composition demonstrates a tensile elongation greater than 0.66%, as measured at 23° C.

8. The polyamide composition of claim 1, wherein the polyamide polymer has a theoretical amine end group content ranging from 62 µeg/gram to 82 µeg/gram.

9. The polyamide composition of claim 1, wherein the polyamide composition does not comprise copper or copper-based compounds.

10. The polyamide composition of claim 1, wherein the weight ratio polyamide polymer to glass fibers ranges from 0.7:1 to 3.0:1.

11. The polyamide composition of claim 1, wherein the relative viscosity of the polyamide polymer is at least 5, according to ASTM D789-18 (2018) using formic acid.

12. The polyamide composition of claim 1, wherein the polyamide composition comprises less than 0.01 wt % copper and from 1 ppb to 0.23 wt % iodide compound.

13. The polyamide composition of claim 1, wherein the polyamide composition further comprises zinc stearate, or stearic acid, or combinations thereof.

14. The polyamide composition of claim 1, wherein the polyamide composition does not comprise calcium-based compounds.

15. The polyamide composition of claim 1, wherein the polyamide polymer comprises:
a first polyamide having a theoretical amine end group content ranging from 75 µeq/gram to 90 µeq/gram;
a second polyamide having a theoretical amine end group content ranging from 40 µeq/gram to 50 µeq/gram;
wherein the theoretical amine end group content of the polyamide polymer is at least 55 µeq/gram.

16. The polyamide composition of claim 1, comprising:
from 61 wt % to 73 wt % polyamide polymer; and
from 25 wt % to 35 wt % glass fibers.

17. The polyamide composition of claim 1, wherein the polyamide polymer comprises a PA-6,6.

18. The polyamide composition of claim 1, wherein the polyamide composition comprises:
from 61 wt % to 73 wt % polyamide polymer; and
from 25 wt % to 35 wt % glass fibers;
wherein the polyamide polymer has a theoretical amine end group content ranging from 62 µeq/gram to 85 µeq/gram; and
wherein the polyamide polymer has a relative viscosity ranging from 36 to 55
wherein the weight ratio of polyamide polymer to glass fibers ranges from 1.5:1 to 2.8:1; and
wherein, when hydrolysis aged for 1000 hours at 130° C., the polyamide composition demonstrates an impact resilience greater than 19.75 kJ/m$^2$, as measured at 23° C.

19. The polyamide composition of claim 1, wherein the polyamide composition comprises:
from 61 wt % to 73 wt % polyamide polymer wherein the polyamide polymer comprises
from 27 wt % to 72 wt % of a first polyamide having a theoretical amine end group content ranging from 75 µeq/gram to 90 µeq/gram; and
from 0 wt % to 50 wt % of a second polyamide having a theoretical amine end group content ranging from 20 µeq/gram to 49 µeq/gram;
from 25 wt % to 35 wt % glass fibers;
from 1 ppb to 0.24 wt % iodide compound
less than 0.01 wt % copper; and
wherein the polyamide polymer has a theoretical amine end group content ranging from 60 µeq/gram to 85 µeq/gram; and
wherein the polyamide polymer has a relative viscosity ranging from 36 to 55; and
wherein when hydrolysis aged for 1000 hours at 130° C., the polyamide composition demonstrates an impact resilience greater than 19.75 kJ/m$^2$, as measured at 23° C.; and
wherein, when hydrolysis aged for 500 hours at 130° C., the composition demonstrates a tensile elongation greater than 2.35%.

20. An article comprising the polyamide composition of claim 1.

* * * * *